(12) United States Patent
Shpantzer et al.

(10) Patent No.: US 7,167,651 B2
(45) Date of Patent: Jan. 23, 2007

(54) SYSTEM AND METHOD FOR CODE DIVISION MULTIPLEXED OPTICAL COMMUNICATION

(75) Inventors: Isaac Shpantzer, Bethesda, MD (US); Michael Tseytlin, Bethesda, MD (US); Yaakov Achiam, Rockville, MD (US); Aviv Salamon, Washington, DC (US); Israel Smilanski, Rockville, MD (US); Olga Ritterbush, Rockville, MD (US); Pak Shing Cho, Gaithersburg, MD (US); Li Guoliang, North Potomac, MD (US); Jacob Khurgin, Baltimore, MD (US); Yehouda Meiman, Rishon Letzion (IL); Alper Demir, Jersey City, NJ (US); Peter Feldman, Short Hills, NJ (US); Peter Kinget, Summit, NJ (US); Nagendra Krishnapura, Hoboken, NJ (US); Jaijeet Roychowdhury, Minneapolis, MN (US); Joseph Schwarzwalder, Gaithersburg, MD (US); Charles Sciabarra, Ellicott City, MD (US)

(73) Assignee: CeLight, Inc., Silver Spring, MD (US)

( * ) Notice: Subject to any disclaimer, the term of this patent is extended or adjusted under 35 U.S.C. 154(b) by 653 days.

(21) Appl. No.: 09/962,243

(22) Filed: Sep. 26, 2001

(65) Prior Publication Data
US 2002/0145787 A1 Oct. 10, 2002

Related U.S. Application Data

(60) Provisional application No. 60/234,930, filed on Sep. 26, 2000.

(51) Int. Cl.
*H04J 4/00* (2006.01)
*H04B 10/00* (2006.01)
*H04B 10/04* (2006.01)
*H04B 10/06* (2006.01)

(52) U.S. Cl. .................. 398/77; 398/74; 398/152; 398/184; 398/205

(58) Field of Classification Search ................ 398/74, 398/77, 79, 152, 162, 184, 198, 205
See application file for complete search history.

(56) References Cited

U.S. PATENT DOCUMENTS 5,060,312 A    10/1991   Delavaux (Continued)

FOREIGN PATENT DOCUMENTS

DE    3442988    6/1985

*Primary Examiner*—Dalzid Singh

(57) ABSTRACT

A system for optical communication forms a family of orthogonal optical codes modulated by a data stream. The orthogonal codes are formed by creating a stream of evenly spaced-apart pulses using a pulse spreader circuit and modulating the pulses in amplitude and/or phase to form a family of orthogonal optical code words, each representing a symbol. A spreader calibration circuit is used to ensure accurate timing and modulation. Each code word is further modulated by a predetermined number of data bits. The data modulation scheme splits a code word into H and V components, and further processes the components prior to modulation with data, followed by recombining with a polarization beam combiner. The data-modulated code word is then sent, along with others to receiver. The received signal is detected and demodulated with the help of a symbol synchronization unit which establishes the beginning and end of the code words. A polarization mode distortion compensator at the receiver cooperates with a state of polarization compensator at the transmitter to mitigate polarization distortion in the fiber.

18 Claims, 21 Drawing Sheets

U.S. PATENT DOCUMENTS

| | | |
|---|---|---|
| 5,654,818 A | 8/1997 | Yao |
| 6,025,944 A * | 2/2000 | Mendez et al. ............... 398/78 |
| 6,266,457 B1 * | 7/2001 | Jacob ......................... 385/11 |
| 6,915,077 B1 * | 7/2005 | Lo .............................. 398/47 |
| 2004/0160661 A1 | 8/2004 | Hurrell et al. |
| 2004/0208414 A1 | 10/2004 | Lee et al. |

* cited by examiner

SYSTEM AND METHOD FOR CODE DIVISION MULTIPLEXED OPTICAL COMMUNICATION

RELATED APPLICATIONS

The present application claims priority to U.S. Provisional application No. 60/234,930, filed Sep. 26, 2000.

FIELD OF THE INVENTION

The present invention relates to the field of optical communication systems utilizing modulation techniques to obtain high spectral efficiency.

BACKGROUND OF THE INVENTION

Dense wavelength division multiplexing (DWDM) increases the capacity of embedded fiber by assigning incoming optical signals to specific frequencies (wavelength, lambda) within a designated frequency band and then multiplexing the resulting signals out onto one fiber. DWDM combines multiple optical signals so that they can be amplified as a group and transported over a single fiber to increase capacity of the telecommunication network. Each signal carried can be at a different rate (OC-3112/24, etc.) and in a different format (SONET, ATM, data, etc.). Limiting bandwidth of the useable band of the optical fiber to accommodate future growth is the driving force behind the effort to increase the spectral efficiency of DWDM systems.

FIG. 1 is a block diagram of a prior art simplex DWDM system. A DWDM multiplexer 110 combines several optical signals, hereinafter referred to as channels, into a single multi-channel optical signal that is transmitted through the optical fiber 120. Optical amplifiers 125 may be connected to the optical fiber 120 to amplify the optical signal. Conversely, the DWDM demultiplexer 130 receives the multi-channel optical signal transmitted through the optical fiber 120 and splits it into separate channels. Each channel is characterized by a distinct wavelength designated as $\lambda_i$ in FIG. 1 where the index, i, runs from 1 to N where N is the number of channels in the DWDM system. For an N-channel DWDM system, there are N transmitters 140 and N receivers 150 with one transmitter 140 and one receiver 150 for each channel. A transmitter 140 generates the optical carrier signal at the channel wavelength and modulates the carrier signal with a single data stream before transmitting the modulated optical signal to the multiplexer 110. The multiplexer 110 then combines the N modulated optical signals having different channel wavelengths into a single multi-channel optical signal, and sends this through the fiber 120. The demultiplexer 130 receives the multi-channel optical signal and separates it into the different channel wavelengths. Each receiver 150 then demodulates one of the demultiplexed channel signals to extract the data signal. While FIG. 1 shows a prior art simple system, it is understood that in real life, a duplex system is used, with one or more transmitters and receivers at each end. Dutton, Harry J. R., *Understanding Optical Communications*, 1998, pp. 513–568, ISBN 0-13-020141-3 presents a description of the DWDM system and of its components and is herein incorporated by reference.

The data rate (in bits per second or bps) through a single optical fiber may be increased by combining one or more of the following methods: increasing the data modulation rate; increasing the number of channels per fiber; and selecting a modulation method having a higher spectral efficiency.

Increasing the data modulation rate is limited by semiconductor technology and cost, as well as frequency-dependent fiber impairments as chromatic and Polarization Mode Dispersion (PMD). Increasing the number of channels per fiber is limited by the properties of optical component materials. Current and proposed implementations of DWDM systems use a channel modulation rate of about 10 GHz (OC-192) and use 40 channels over the conventional optical band (C-band) between 1530 nm and 1560 nm. Therefore, the transmission bit-rate through a single optical fiber is about 400 Gbps. Each channel has a bandwidth of about 100 GHz. The spectral efficiency is defined as the channel bit-rate divided by the channel bandwidth. The spectral efficiency of the system is therefore 0.1 bit/Hz. The spectral efficiency may be doubled by using a coherent modulation technique such as quadrature phase shift keying (QPSK). QPSK encodes two bits per modulation period and therefore doubles the channel transmission bit-rate to 20 Gbps. The two bits encoded during QPSK are referred to as a symbol and the modulation period is referred to as the symbol period. The inverse of the symbol period is the symbol rate.

The channel bit-rate may also be doubled by combining two data streams into a single channel. U.S. Pat. No. 6,038,357 issued to Pan discloses a fiber optic network that combines two data streams into a single channel by polarizing the optical signal modulated by the first data stream to a polarization plane that is orthogonal to the polarization plane of the optical signal modulated by the second data stream.

Polarization mode dispersion (PMD) arises in optical fiber when circular symmetry is broken by the presence of an elliptical core or by noncircularly symmetric stresses. The loss of circular symmetry results in the difference in the group velocities associated with the two polarization modes of the fiber. The main effect of the PMD is the splitting of the narrow-band pulse into two orthogonally polarized pulses (dual imaging) that propagate through the fiber with the different group velocities. As the dual images propagate through the birefringent fiber, there states of polarization (SOP) constantly undergo changes causing the random coupling between the two images.

The PMD varies randomly from fiber to fiber. In the single fiber, the PMD also varies randomly with the optical carrier frequency and ambient temperature. PMD broadens and degrades the signal and limits the distance the signal may propagate before the information encoded in the signal is lost.

Therefore, there remains a need to improve the spectral efficiency of existing/planned DWDM standards (OC-48 at 2.048 Gbps or OC-192 at 10 Gbps) using existing fiber optic cables. There also remains a need for PMD compensation of the received optical signal.

SUMMARY OF THE INVENTION

In one aspect, the present invention is directed to an optical communication system having a transmitter configured to receive a first data stream and transmit a code division multiplexed optical signal comprising a number K code words modulated with first data from said data stream; and a receiver optically connected to the first transmitter and configured to receive said code division multiplexed optical signal, detect and demodulate said K code words within the code division multiplexed optical signal, and output said first data, with the K code words being orthogonal to one another. The code words in said code division multiplexed optical signal include H and V polarizations.

In another aspect, the present invention is directed to a node in an optical communication system, the node having such a transmitter co-located with such a receiver.

In another aspect, the present invention is directed to a transmitter for a code division multiplexed optical communication system for sending K code words, each code having P pulses. In one embodiment, the transmitter has a pulsed light source, a transmitter splitter configured to output at least a number K identical code beams from the pulsed light source, a code modulator for each of the K identical code beams, each code modulator configured to receive one of the K identical code beams and output a corresponding data beam, and a transmitter combiner receiving and combining the K data beams to form a code division multiplexed optical signal comprising K data-modulated code words.

In another embodiment, the transmitter of the present invention has multiple coding stages, including a first coding stage which employs dynamic code modulators and a second coding stage that employs pulse spreaders.

In another aspect, the present invention is directed to a code modulator for use in an optical transmitter. The code modulator includes a pulse spreader and a data modulator. The pulse spreader includes a splitter which splits an incoming pulse into a plurality of P parallel pulses, P being the number of time chips in a code word, a time chip modulator to delay and code modulate each of the P pulses, and a P:1 combiner to create a single code word from the individually delayed and code modulated pulses.

In another aspect, the present invention is directed to a pulse spreader circuit configured to receive a single pulse within a predetermined time window and output an imprinted code beam having a number P modulated pulses within that time window. A spreader calibration unit receives the imprinted code beam from the pulse spreader and a reference light source as inputs, and outputs a spreader control signal which is sent to the pulse spreader.

In another aspect, the present invention is directed to a spreader calibration unit that ensures that each of the pulse spreaders has proper modulation by detecting and correcting an error in phase among a number P individual pulses belonging to one of a number K code words or pulse streams, each pulse occupying a chip period of length C.

In one embodiment, the optical pulse spreader calibration unit includes a first switch configured to select one from among (a) said K pulse streams, and (b) a reference signal, to thereby output a first signal; a second switch configured to select one from among (a) a pulsed light source having a pulse period of P*C and (b) to thereby output a second signal; a number P calibration delays each receiving the second signal as an input, the p-th calibration delay outputting a p-th delayed version of the second signal delayed by (p−1)*C; a third switch receiving and combining P delayed versions of the second signal from P corresponding calibration delays to thereby output a third signal; and an optical phase detector configured to receive the first and third signals and output in-phase and quadrature signals derived from the first and third signals.

In another embodiment, the optical pulse spreader calibration unit includes a first switch configured to select one of the K encoded pulse streams and output a first signal; a phase detector having said first signal input thereto; a light beam directed into the phase detector via a gate during a selected chip period determined by variable electronic delay; wherein the phase detector determines an amplitude product of, and a phase difference between, the first signal and the gated light beam; and the amplitude product and phase difference are passed to a processor that determines an offset that should be applied to correct an error in phase or amplitude of a pulse; and the processor outputs a signal to control the variable electronic delay.

In another aspect, the present invention is directed to an optical signal data modulator for use in a code modulator of the present invention. The optical signal data modulator is configured to receive a number P time chips of a code word belonging to a family of orthogonal codes, and modulate the orthogonal code words with data. The data modulator includes a power splitter which splits the incoming pulses into H and V components, a pair of power splitters to power split each component into H1 and H2 and V1 and V2 sub-components, respectively, a pair of phase shifters to phase shift the H2 and V2 sub-components by 90 degrees from H1 and V1 accordingly, four bit-modulators to then modulate each sub-component, a pair of first combiners to combine the two modulated H components to form a data modulated H' component and a data modulated V' component, and a polarization beam combiner which combines the data modulated H' and V' components into two orthogonal polarizations.

In another aspect, the present invention is directed to a receiver having a receiver splitter configured to split a received information signal comprising K orthogonal data-modulated code words into K identical received information signals, and K code receivers, each code receiver having a receiver pulse spreader configured to create a reference signal which corresponds to one of the K orthogonal data-modulated code words, and a receiver unit having the received information signal and the reference signal input thereto, wherein the receiver unit is configured to detect and demodulate that one of the K data-modulated code words to which the reference signal corresponds.

In another aspect, the present invention is directed to an optical detection circuit for use in a receiver unit in accordance with the present invention. The optical detection circuit receives the information signal and the reference signal, and outputs in-phase and quadrature components of first and second orthogonal polarization components of the information signal. The optical detection circuit includes a polarization beam splitter which splits the information signal into first and second orthogonal polarization components, a first optical phase detector that receives the first orthogonal polarization component and a reference signal as inputs, and outputs in-phase and quadrature components of the first orthogonal polarization component, a second optical phase detector which receives the second orthogonal polarization component and the same reference signal as inputs, and outputs in-phase and quadrature components of the second orthogonal polarization component, and a symbol synchronizer circuit that receives the in-phase and quadrature components of the first and second orthogonal polarization components of the information signal, and outputs at least one timing signal to synchronize symbol boundaries of said data-modulated codewords in said optical phase detectors.

A polarization mode dispersion controller associated with the receiver receives digitized in-phase and quadrature components of the first and second orthogonal polarization components of the information signal, and outputs at least one polarization control signal in response thereto.

In another aspect, the present invention is directed to an optical phase detector comprising an optical hybrid detector having first and second signal inputs and first and second signal outputs, the first signal output being proportional an in-phase difference between the first and second signal inputs, and the second signal output being proportional to a quadrature difference between the first and second signal inputs; a first signal conditioning cascade circuit arranged to process the first signal output from the optical hybrid detector to thereby form a digitized in-phase component signal; and a second signal conditioning cascade circuit arranged to process the second signal output from the optical hybrid detector to thereby form a digitized quadrature component signal.

In another aspect, the present invention is directed to an optical hybrid detector having first and second signal inputs, and first and second signal outputs. The optical hybrid detector includes splitters, phase shifters and combiners to form the complex conjugate components of the first and second signal inputs. These components are input to a pair of matched detectors that output the in-phase and quadrature differences between the first and second signal inputs.

In another aspect, the present invention is directed to a symbol synchronizer for synchronizing symbols of a selected data signal from a multiplexed data signal. The symbol synchronizer uses the symbol-to-symbol energy difference, instead of finding the maximum energy.

In another aspect, the present invention is directed to a self-homodyne receiver. The self-homodyne receiver has a polarizing beam splitter to split an incoming optical code division multiplexed signal having K orthogonal code words modulated with data into first and second orthogonal polarizations. The receiver has K sets of first and second code despreaders. The k-th set of the first and second despreaders is configured to output first and second phase information, respectively, of data modulated on the k-th code word having first and second orthogonal polarizations, respectively. First and second optical phase detectors compare the first/second phase information from a current symbol with the first/second phase information from an immediately preceding symbol, and output first/second signals reflective of the phase differences between data from the current and preceding symbols.

In another aspect, the present invention is directed to a PSP-based PMD compensator, to compensate for PMD caused by the fiber and its environment over a long distance run, without the use of a repeater. The receiver restores a transmitted signal's polarization by aligning the SOP of the received signal with the SOP of the signal launched into the fiber. The transmitter selects the optimal SOP to launch the optical signal into the fiber by aligning the SOP with the principal state of polarization (PSP) axes of the fiber. The SOP transmitted along the PSP axes exhibits the least frequency dependence that minimizes the coupling of the propagating signal. The polarization transformation in the fiber is a time-varying process; therefore, both the receiver PMD compensator and the transmitter SOP compensator must be able to track those changes. The receiver sends back the information to the transmitter via a separate channel to adjust the transmitter SOP compensator to re-align transmitted SOP with PSP.

In yet another aspect, the present invention is directed to a method for adjusting the receiver-end polarization compensation device, and method for adjusting a transmitter-end polarization compensation device.

BRIEF DESCRIPTION OF THE FIGURES

The present invention may be understood by reference to the following detailed description of the preferred embodiment of the present invention, illustrative examples of specific embodiments of the invention and the appended figures in which:

FIG. 14b is a flow diagram of a PMD controller for compensating the receiver of FIG. 14a;

FIG. 14c is a flow diagram of a PMD controller for compensating the receiver and the transmitter of FIG. 14a.

DETAILED DESCRIPTION OF THE PREFERRED EMBODIMENT

Figure 1:
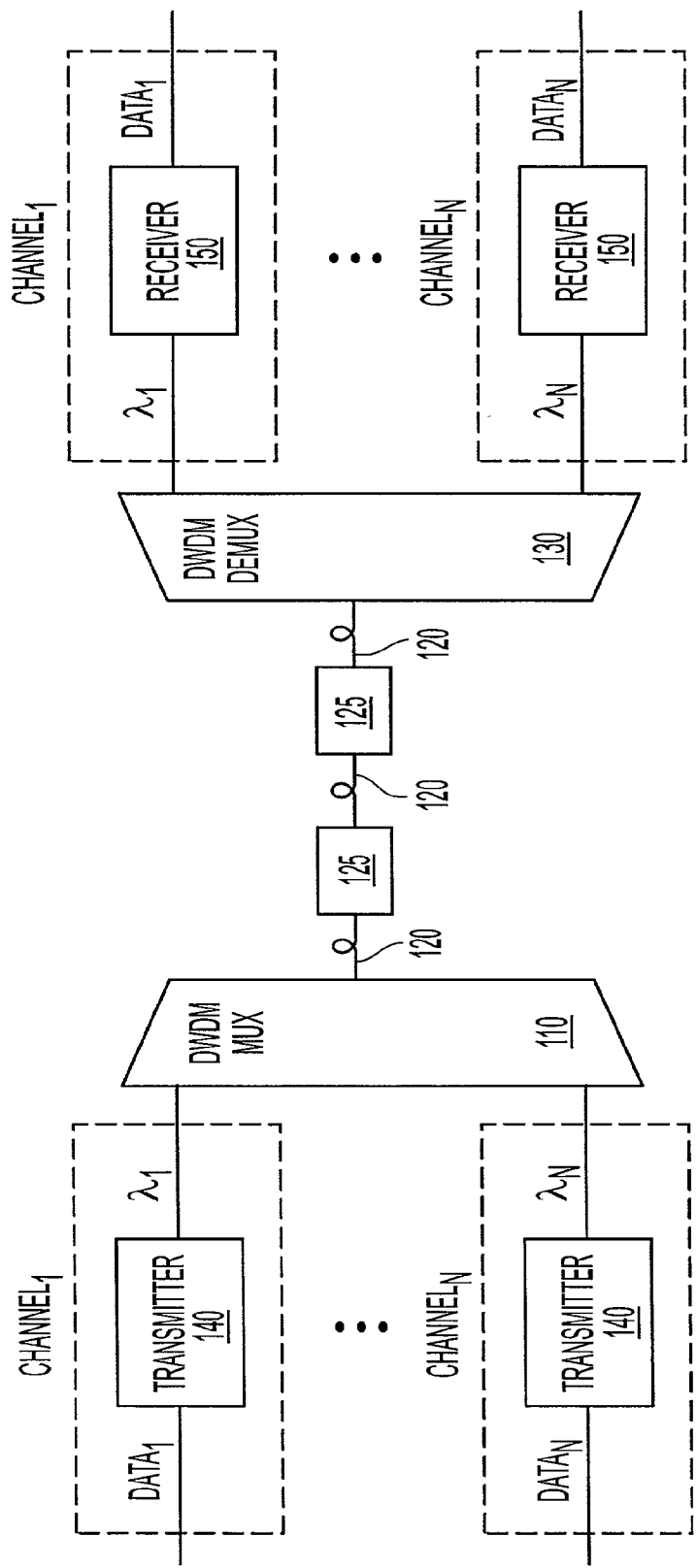
FIG. 1 is a block diagram of a simplex prior art DWDM system architecture.
Figure 2A:
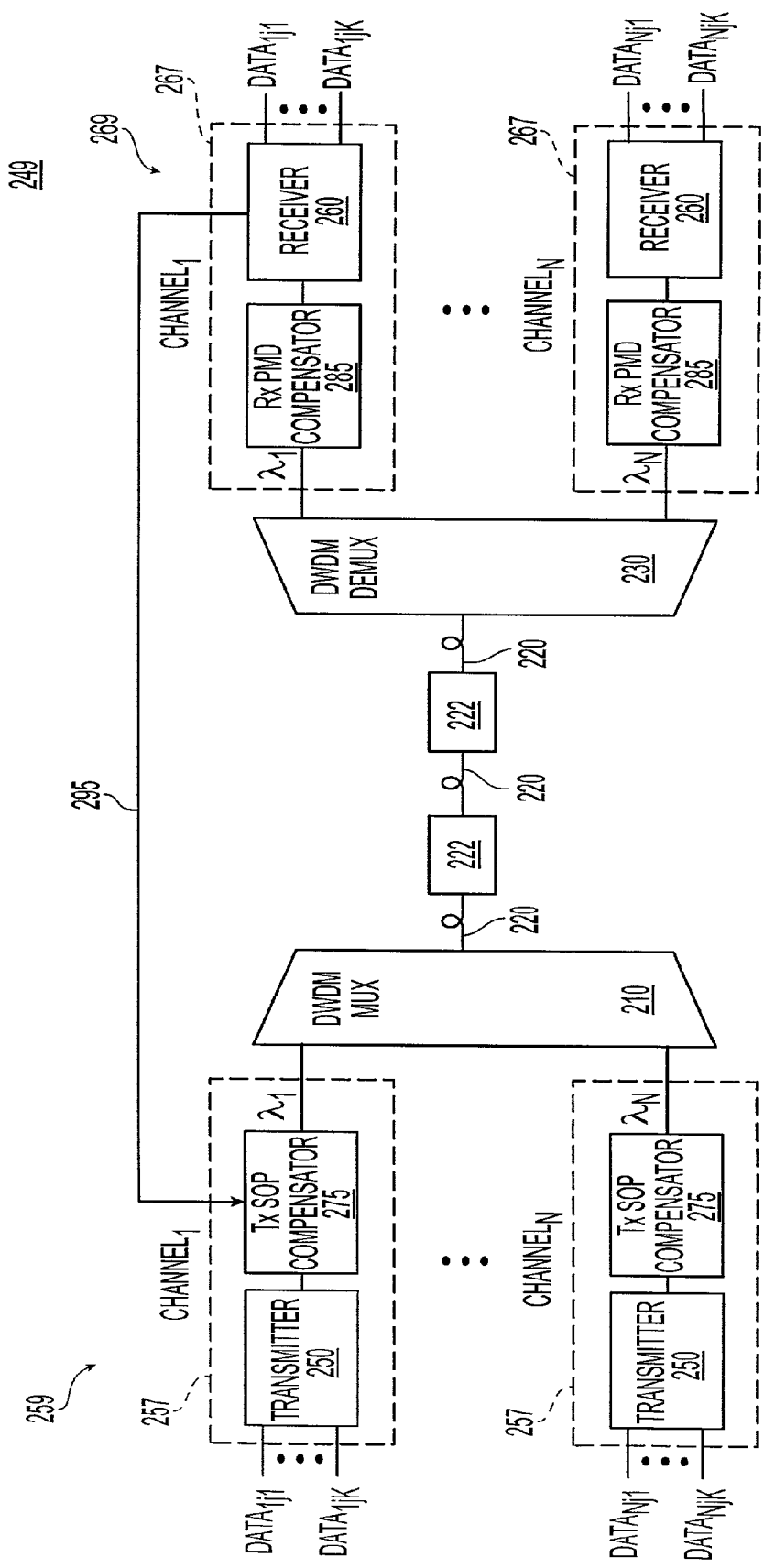
FIG. 2a is a block diagram of a simplex optical communication system in accordance with a preferred embodiment of the present invention.

FIG. 2a is a block diagram of the system architecture of a simplex communication system 249 in accordance with the present invention. The communication system 249 has a transmitter end 259 and a receiver end 269. The transmitter end 259 has N transmitter modules 257, each corresponding to one of N channels, each channel being characterized by a different wavelength, $\lambda_i$, where the index, i, runs from 1 to N. The receiver end has N corresponding receiver modules 267. As seen in FIG. 2a, each transmitter module 257 includes a transmitter 250 and preferably also incorporates transmitter-end state of polarization (SOP) compensation 275 positioned between the transmitter and the multiplexer. One such transmitter-end SOP compensator is provided for each channel. Similarly, each receiver module 267 includes a receiver 260 and preferably also incorporates a receiver-end polarization mode distortion (PMD) compensation 285. As seen in FIG. 2a, the receiver PMD compensation is positioned between the demultiplexer and each receiver, with one such compensator again being provided for each channel.

Each transmitter module 257 receives, for its channel, a total of K data streams, the data streams being depicted by $DATA_{ijk}$, where subscript 'i' is again the channel index, j is the polarization index (either 'H' or 'V') and subscript 'k' is the data stream index. For a given 'i' and 'k', the 'H' and 'V' data streams are preferably used to modulate the same code word on H and V polarizations. Thus, each code word, when transmitted, is used on both polarizations, and each polarization carries different data $DATA_{iHk}$ and $DATA_{iVk}$. Thus, since the index 'j' takes on only two possible values, one may consider the incoming data streams to effectively comprise 2K data streams, each having a first component that will ultimately be encoded and sent on H polarization and a second component that will ultimately be encoded and sent on V polarization.

While the above 'data stream' nomenclature may be expedient to illustrate the effects of coding in accordance with the present invention, it should be kept in mind that a single data stream may be formatted in any number of ways including the "$DATA_{ijk}$" representation discussed above. What is important is that the incoming data preferably is used to modulate the same code word on both H and V polarizations, with a total of K code words being combined and transmitted on each channel. Each code word includes both the 'H' and 'V' data components, i.e., both 'j' values from a "$DATA_{ijk}$" data stream and these are encoded in a single code word.

Each transmitter module 257 preferably encodes the K data streams using K codes created by its transmitter 250, and preferably four bits are encoded on each code word. The encoded signal for each channel is sent to a multiplexer 210 which combines the encoded channels into a single encoded multi-channel optical signal. The encoded multi-channel optical signal is sent over an optical fiber 220 to a demultiplexer 230 which separates the encoded multi-channel optical signal into the various channel wavelengths. The individual channel wavelengths are then sent on a receiver module 267 corresponding to that channel. If desired, optical amplifiers 222 may be used, although this is not a requirement of the present invention. At the receiver module 267, the received signal is received and demodulated by the receiver 260 which outputs the K data streams.

When compensation is provided for, the receiver circuitry 260 sends an auxiliary signal 295 to the transmitter-side SOP compensator 275. This preferably is done out-of-band, on a continuous basis to mitigate polarization mode distortion caused by the fiber and the other optics.

Figure 2B:
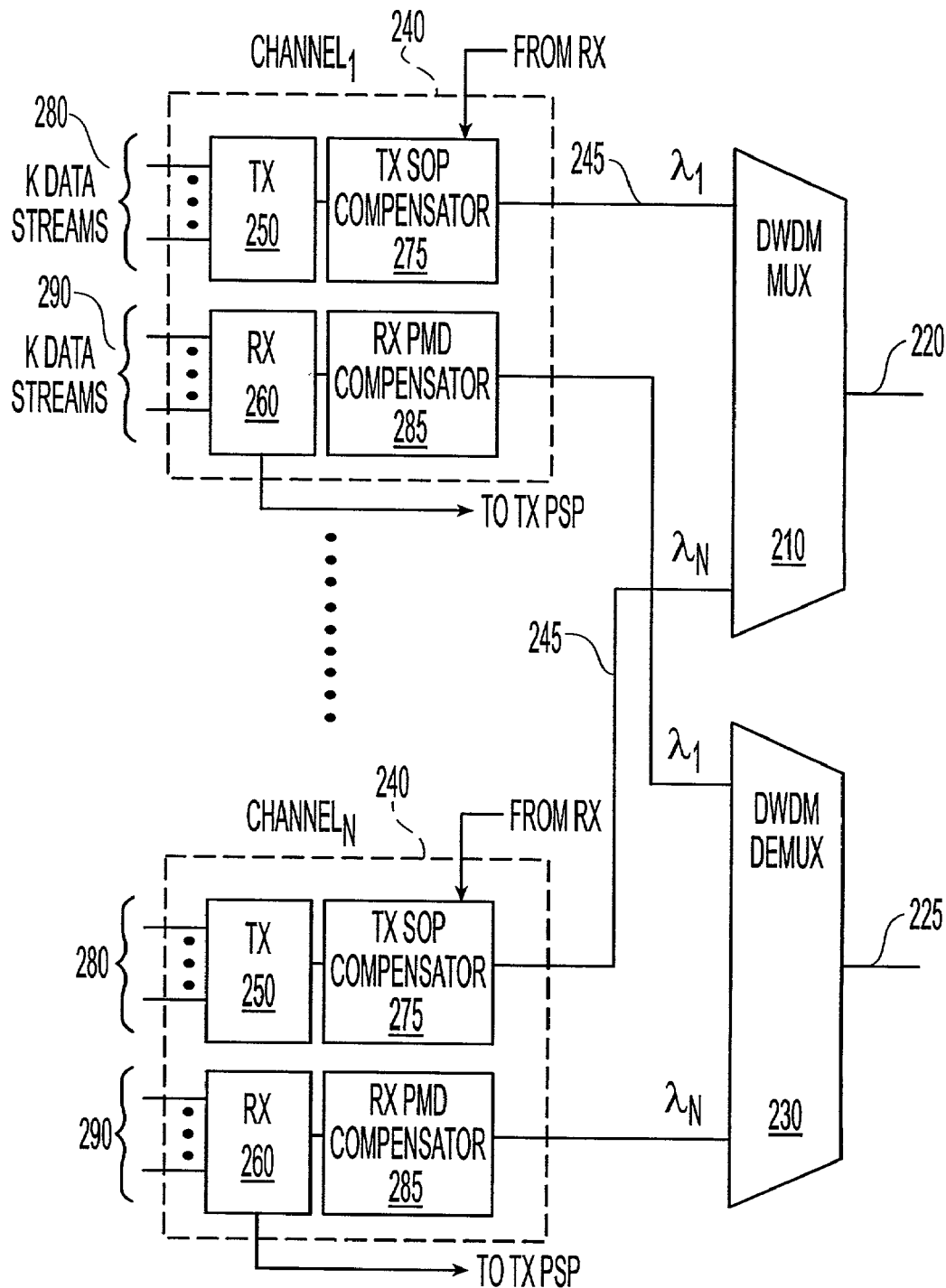
FIG. 2b is a block diagram of one-half of a duplex optical communication system in accordance with a preferred embodiment of the present invention.

FIG. 2b shows a node 299 representing one-half of a bidirectional fiber optic communication link in accordance with the present invention. The node 299 preferably accommodates a number N of channels 240, each channel comprising a set including a transmitter 250 and a receiver 260 which are co-located. Indeed, the entire suite of all N channels preferably are placed at a single site or node.

Each end of the link has a DWDM multiplexer (Mux) 210 connected to the downstream optical fiber 220 and a DWDM demultiplexer (Demux) 230 connected to the upstream optical fiber 225. The downstream fiber 220 is connected to the Demux at the other end of the link and the upstream fiber 225 is connected to the Mux at the other end of the link. In a preferred embodiment, the optical fibers 220 225 are single mode fibers capable of transmitting optical signals in the C-band (wavelengths between 1530 nm and 1560 nm). The Mux 210 multiplexes N channels 240 for transmission through the fiber 220 and the Demux 230 demultiplexes the received optical signal from the fiber 220 into N channels 240. For purposes of clarity, FIG. 2 shows only two channels 240 but it is understood that N channels are represented in FIG. 2.

Each channel 240 is characterized by a different wavelength, $\lambda_i$, where the index, i, runs from 1 to N. In a preferred embodiment, N is equal to 40 thereby giving each channel a bandwidth of about 100 GHz. Each channel 240 is capable of carrying K codes 280 and each code 280 carries a data stream. For each channel 240, a transmitter (Tx) 250 creates the K codes, modulates each code 280 with a data stream, and combines the K data modulated codes into an optical channel signal 245 before passing the optical signal 245 to the multiplexer 210. Each channel 240 also includes a receiver (Rx) 260 that recovers the K data streams from the Demux 230.

In a preferred embodiment, K=16 codes are carried in each of the N=40 channels of the C-band at a symbol rate of 2.5 GHz with a symbol period of 400 ps, and 4 bits per symbol. This results in a capacity of 6.4 Tb/s and a spectral efficiency of 1.6 bits/Hz. Each code is further time sliced into 16 chips per symbol period for a chip period C=25 ps.

The detailed description of each component is now described. The Mux 210, Demux 230, optical fiber 220, and fiber amplifier components 222 are known to one of skill in the optical communications art and need not be described further. Common devices such as splitters, combiners, phase shifters, optical switches, delay lines, intensity and phase modulators and CW lasers are also known to one of skill in the optical communication art and need not be described further. Similarly, one skilled in the art of digital signal processing is able to implement the functions of adders, subtractors, squaring and absolute value using a DSP chip and also designing amplifiers and other standard components without undue experimentation. Accordingly details of such implementations are not included herein.

Transmitter

Figure 3:
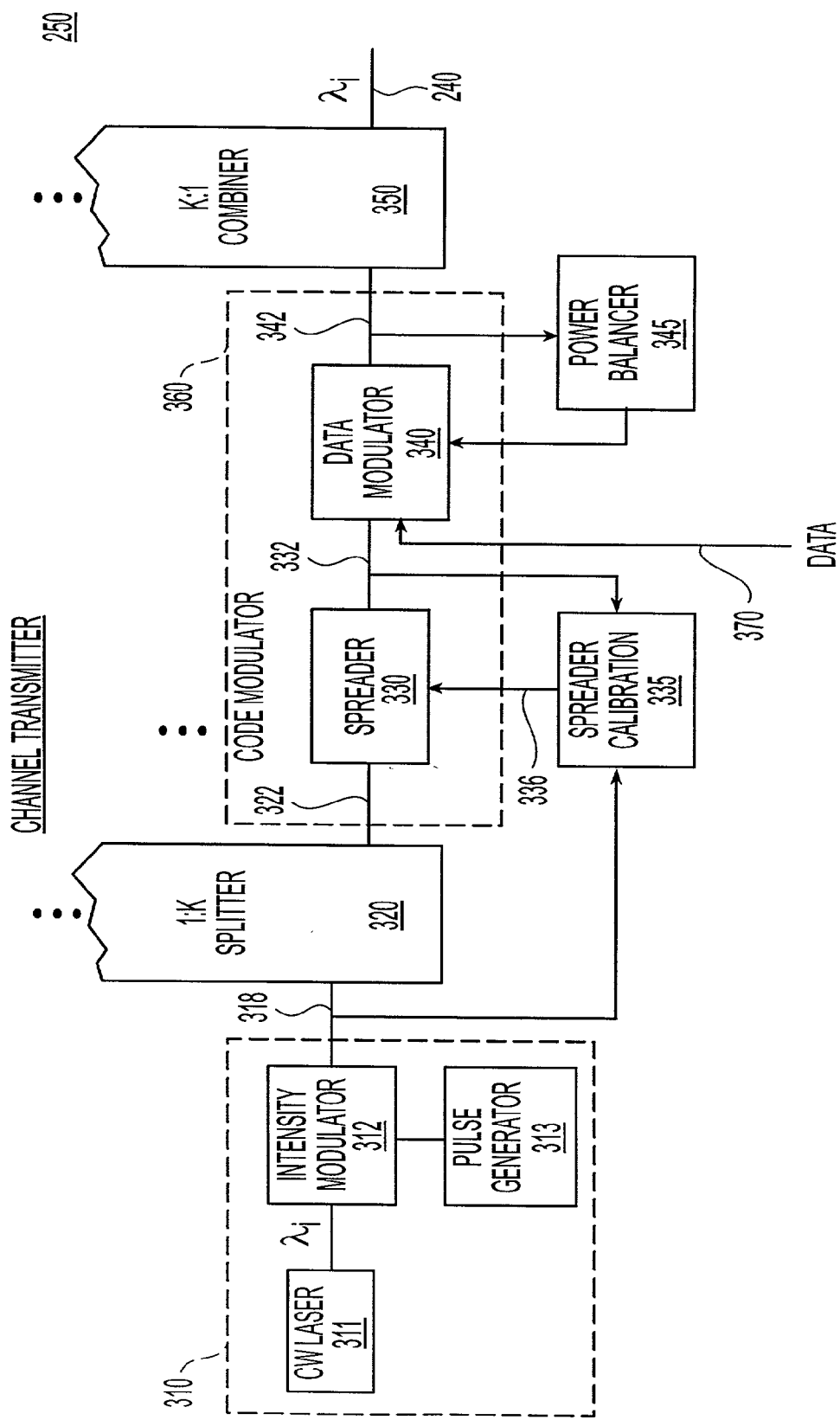
FIG. 3 is a block diagram of a transmitter in accordance with one embodiment of the present invention.

FIG. 3 is a block diagram of a transmitter 250 configured to create a code division multiplexed signal in accordance one embodiment of the present invention. Coherent pulsed light source 310 generates a linearly polarized monochromatic light beam characterized by wavelength, $\lambda_i$. In a preferred embodiment, the coherent pulsed light source 310 comprises a continuous wave laser 311 that generates a coherent monochromatic light beam. The light beam is directed into an intensity modulator 312. The intensity modulator 312 is, in turn, controlled by a pulse generator 313. In a preferred embodiment, the pulse generator 313 and intensity modulator 312 produce an optical stream having a pulse period (time between pulses) of T=400 ps, which corresponds to a 2.5 GHz symbol frequency, and a pulse width between 10 ps and 20 ps. In another embodiment, the coherent light source 310 is a mode-locked laser that directly generates a similar pulse stream.

The pulsed light beam 318 is passed through a splitter 320 that splits the light beam 318 into K code beams 322. Each code beam 322 is modified to produce K unique codes using a code modulator 360. For purposes of clarity, FIG. 3 shows the modification of only one of the K code beams 322 and it is understood that the remaining code beams are directed to structures identical to those designated as 360 in FIG. 3. In a preferred embodiment, K is equal to 16 although any number of code beams 322 may be used and is within the scope of the present invention.

Each code beam 322 is passed through pulse spreader 330 wherein each code beam 322 is imprinted with a unique code comprising P pulses and having duration T. Each imprinted code beam 332 is then passed through a data modulator 340. The data modulator 340 modulates the imprinted code beam 332 with a data stream 370 to produce a data beam 342. Data beam 342 comprises two orthogonal polarizations, each modulated independently by the data, as discussed below with regard to the data modulator 340. Each data beam 342 is then combined with the other data beams having wavelength $\lambda_i$ in a combiner 350 to form a channel beam. The channel beam output by the transmiter is thus a code division multiplexed optical signal comprising K data-modulated code words which are sent on the channel 240. A single channel 240 is therefore capable of carrying K data streams.

In a preferred embodiment, a single spreader calibration unit 335 controls each of the K pulse spreaders 330 in the i-th channel only. For this, the spreader calibrator 335 monitors each of the K imprinted code beams 332 and controls the K pulse spreaders 330 with a spreader control signal 336 to insure the accuracy and stability of each of the imprinted code beams 332. In another embodiment, a spreader calibration unit 335 controls each of the K pulse spreaders 330 for all N channels.

Pulse Spreader

Figure 4:
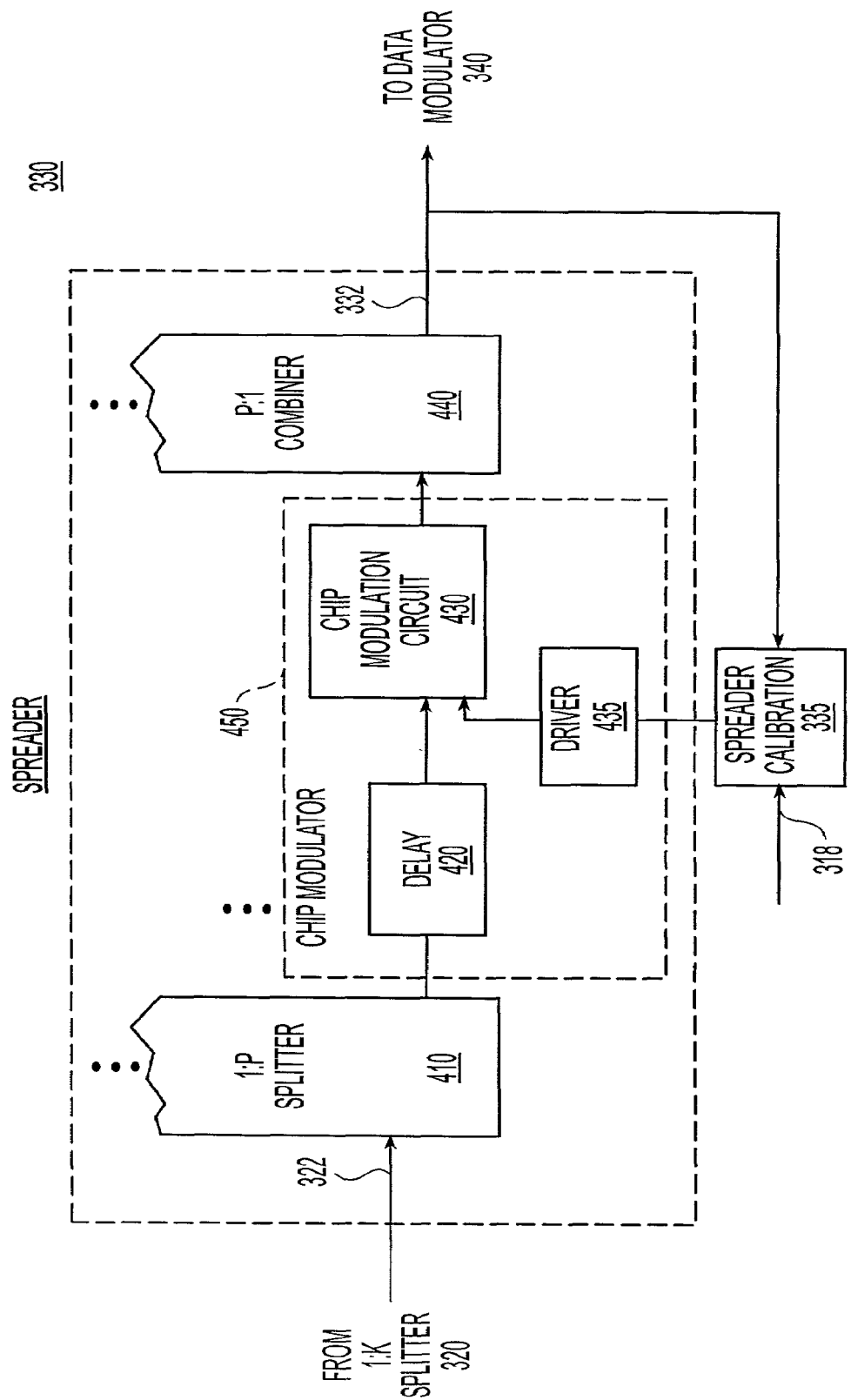
FIG. 4 is a block diagram of the pulse spreader used in the transmitter of FIG. 3.

FIG. 4 is a block diagram of a preferred embodiment of the pulse spreader 330. A portion of the pulsed light beam 318 is directed to the spreader calibration unit 335 while the code beam 322 is split by a 1:P splitter 410, P representing the number of code bits (referred to a "chip") in each code word. In a preferred embodiment, the code beam is split into P=16 split beams, however, any number of split beams may be used and is within the scope of the invention. For purposes of clarity, FIG. 4 shows the modification of only one of the P split beams and it is understood that the remaining split beams are directed to structures identical to the chip modulators 450 of FIG. 4.

Each of the P split beams is passed through a delay 420 that delays the split beam by a predetermined amount. In a preferred embodiment, the delay 420 is a multiple of T/P where T is the symbol period and P is the number of split beams or chips. In a preferred embodiment, the delay 420 may be a calibrated length of waveguide such as an optical fiber or a semiconductor waveguide. The delay increment, C=T/P, is referred to as a chip period and there are P chip periods per symbol period. In a preferred embodiment, a symbol period of T=400 ps is selected and P=16 is chosen, resulting in a chip period of C=25 ps.

The first split beam p=1 is not delayed, the second split beam p=2 is delayed by one chip period, the third split beam is delayed by two chip periods p=3, etc., and the pth split beam is delayed by p=(P−1) chip periods. The result of the family of delays 420 acting on the P split beams provides each split beam with a single pulse (preferably of length 10–20 ps), each pulse being positioned in a unique "time chip" within the symbol period T, the time chips being spaced apart in time by T/P. If the split beams are now combined, the repetition rate of the pulse train of the combined beam would be multiplied by a factor of P, or in the case of the instant example, would increase from 2.5 GHz to 40 GHz.

The split beams, however, are not combined immediately after the delays 420. Instead, each delayed split beam is passed through a chip modulation circuit 430. In a preferred embodiment, the chip modulation circuit 430 phase shifts each pulse by a predetermined amount, $\delta_{kp}$, where $\delta_{kp}$ is the phase shift applied to the p-th chip of the k-th code. In a preferred embodiment, the chip modulation circuit 430 is an opto-electronic device such as a Pockels cell phase modulator. In another embodiment, the chip modulation circuit 430 may also apply an amplitude scaling, $a_{kp}$, to each split beam. Regardless of how the chip modulation circuit 430 is implemented, combiner 440 combines each of the delayed-and-now-chip-modulated split beams into a single code beam 332. A portion of the code beam 332 exiting the combiner 440 is directed to the spreader calibration unit 335.

The set of modulations provided by the chip modulator, $\{\delta_{k1}, \ldots, \delta_{kP}; a_{k1}, a_{kP}\}$, uniquely identify the k-th code and are chosen to be orthogonal to each of the other (K−1) codes. The selection of the orthogonal code sets may be from any one of the orthogonal code sets known to one of skill in the signal processing arts. In a preferred embodiment, the modulation consists of phase shifts given by the following equation:

$$\delta_{kp} = \frac{2\pi(k-1)(p-1)}{P} \quad (1)$$

where p is the chip index varying from 1 to P where P is the number of chips per symbol period and k is the code index varying from 1 to K where K is the number of codes per channel. In the preferred embodiment, K≦P.

Each chip modulation circuit 430 receives input from the spreader calibration unit 335 via a driver 435 belonging to the chip modulator 450. The spreader calibration unit 335 determines the amount of phase shift and/or amplitude scaling each chip modulation circuit 430 applies to its respective split beam. The spreader calibration unit 335 adjusts each shift/scaling by a calibration offset that it determines. The spreader calibration unit 335 may be implemented in a digital signal processor (DSP) of the sort known to those skilled in the digital processing art. In a preferred embodiment, a single spreader calibration unit 335 controls the P chip modulating circuits 430 for all K codes. As will be clear to one of skill in the art, one may use multiple spreader calibration units, such as one for each of the K codes.

The chip modulation circuit 430 is essentially a static modulator because the modulation applied to each chip does not vary except for long term (with respect to the symbol period) drifts or slowly varying conditions such as temperature that are compensated by the spreader calibrator 335. By splitting the code beam 322 into P chips and independently modulating each chip individually every symbol period, the k-th pulse spreader 330 creates an imprinted code beam that carries the code beam's identification at a modulation rate of P times the symbol rate using inexpensive (relative to dynamic modulators capable of modulating at P times the symbol rate) static modulators. However, an alternative to the pulse spreader 330 described above with respect to FIG. 4, is to employ a pulse spreader having a dynamic code modulator capable of modulating the code beam 322 at P times the symbol rate, and this is also contemplated in the system of the present invention.

Figure 5:
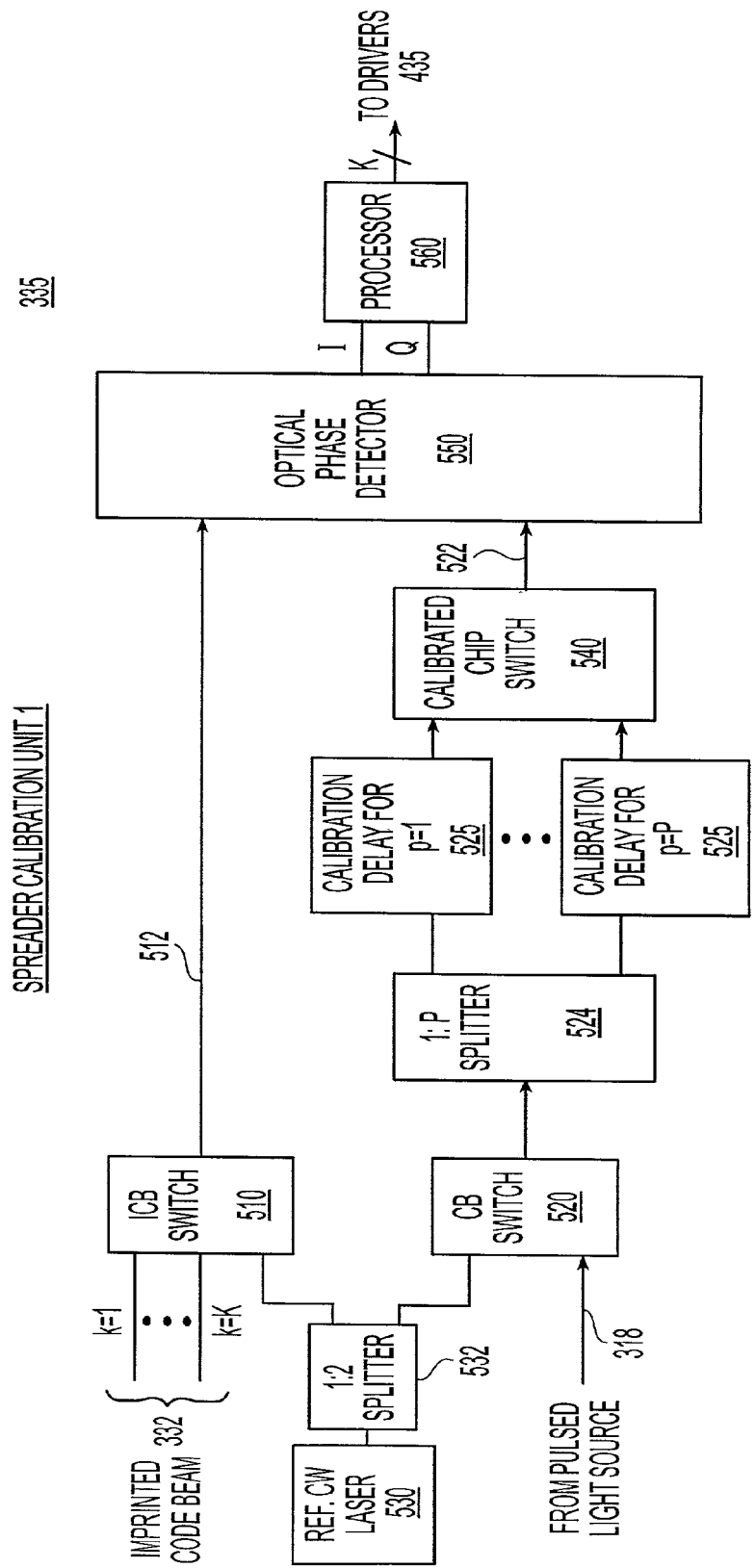
FIG. 5 is a block diagram of a first embodiment of a spreader calibrator used with the spreader of FIG. 4.

FIG. 5 is a block diagram of a preferred embodiment of the spreader calibration unit 335. The spreader calibration unit 335 adjusts the modulation applied by the chip modulation circuit 430 to ensure the K code beams remain orthogonal to each other. A portion of the imprinted code beam (ICB) 332 from each of the K pulse spreaders 330 is directed into an ICB switch 510. In a preferred embodiment, a portion of the pulsed light beam 318 is directed into a CB switch 520. A continuous-wave (CW) reference laser 530 generates a reference beam that is directed to both the ICB switch 510 and the CB switch 520 by splitter 532. In an alternate embodiment, a portion of the K code beams (CB) 322 may be directed into the CB switch 520.

At any instant, the ICB switch 510 selects one from among the K+1 inputs and directs the ICB-selected beam 512 to an optical phase detector 550. In other words, the ICB switch 510 selects either one of the K beams 332 from pulse spreader 330 or the reference beam and sends the selected beam onwards.

At any instant, the CB selects either the reference laser beam, or the pulse light source beam. The CB switch 520 directs the selected beam to 1:P splitter 524 which splits the selected beam into P split beams. Each split beam is passed through a unique delay line 525. Each delay line 525 adds a known delay to the split beam that corresponds to the delay of one of the P chips. For example, the p-th delay line will correspond to the p-th chip in each symbol period. The P split beams are directed into a calibrated chip switch 540. The calibrated chip switch 540 selects one of the P delayed split beams and directs the selected delayed split beam 522 into the optical phase detector 550. The optical phase detector 550 calculates the (complex) product of the ICB-selected beam 512 and the complex conjugate of the selected split beam 522, giving the product of their amplitude and the phase difference between the two beams.

When the imprinted code beam 332 for code k is selected by ICB switch 510, the p-th chip of the ICB-selected beam 512 will be proportional to $a_{kp} \cdot e^{j2\pi f(t-\tau_{kp})} \cdot e^{j\delta_{kp}}$, where f is the known beam frequency and $\delta_{kp}$, $a_{kp}$ and $\tau_{kp}$ are the preset phase shift, amplitude scaling and delay applied for the p-th chip by the k-th pulse spreader 330. When the pulsed light beam 318 is selected by CB switch 520, the selected split beam 522 will have a zero signal for all chips except for the chip corresponding to the selected delay line 525. For example, if the split beam switch 540 selects the second delay line corresponding to the second chip of the symbol period, the selected split beam will have a zero signal for the first chip period, a non-zero waveform in the second chip period, and zero signals for the third through P-th chip periods. Selected split beam 522 will be proportional to $e^{j2\pi f(t-\tau_p)}$ where $\tau_p$ is the known p-th delay selected by switch 540.

Since the selected split beam 522 has a non-zero signal only for the p-th delay line (selected by the split beam switch 540), the product determined by the optical phase detector 550 is equal to $a_{kp} \cdot e^{j2\pi f(\tau_p-\tau_{kp})} \cdot e^{j\delta_{kp}}$. Processor 560 measures the amplitude $a_{kp}$ and the phase $\delta_{kp}-2\pi f(\tau_{kp}-\tau_p)$ and commands the spreader calibration unit 335, for the k-th pulse spreader, to maintain $a_{kp}$ and $\delta_{kp}-2\pi f\tau_{kp}$ at the required value given, for example, by equation 1.

Each of the P delay lines 525 ($\tau_p$) are calibrated using the reference CW laser 530 (which may be tapped from CW laser 311) as will now be described. The ICB switch 510 selects the reference laser beam and directs the beam to the optical phase detector 550. CB switch 520 selects the reference laser beam and directs the reference beam to the 1:P splitter 524 where the reference beam is split into P split beams. Each split beam is directed to a delay line 525. A calibrated chip switch 540 selects one of the delayed split beams and directs the selected delayed split beam 522 to the optical phase detector 550. The optical phase detector 550 determines the phase difference between the reference beam selected by the ICB switch 510 and the delayed reference beam selected by the split beam switch 540. The reference beam is proportional to $e^{j2\pi f_o t}$ where $f_o$ is the reference laser's known frequency and the delayed reference beam is proportional to $e^{j2\pi f(t-\tau_p)}$. The phase difference between the two reference beams, $2\pi f_o \tau_p$, gives the delay of the selected delay line 525. Processor 560 stores the phase differences for each of the delay lines 525. Processor 560 also controls the switching of the ICB switch 510, the CB switch 520, and the split beam switch 540.

It is understood in the above description of the spreader calibration circuit 335 of FIG. 5 that the various switches 510, 520 and 540 are controlled by circuitry that has been omitted in the figure. In general, either processor 560, or another controller, or the like, will govern the timing and selection of these switches.

Figure 6:
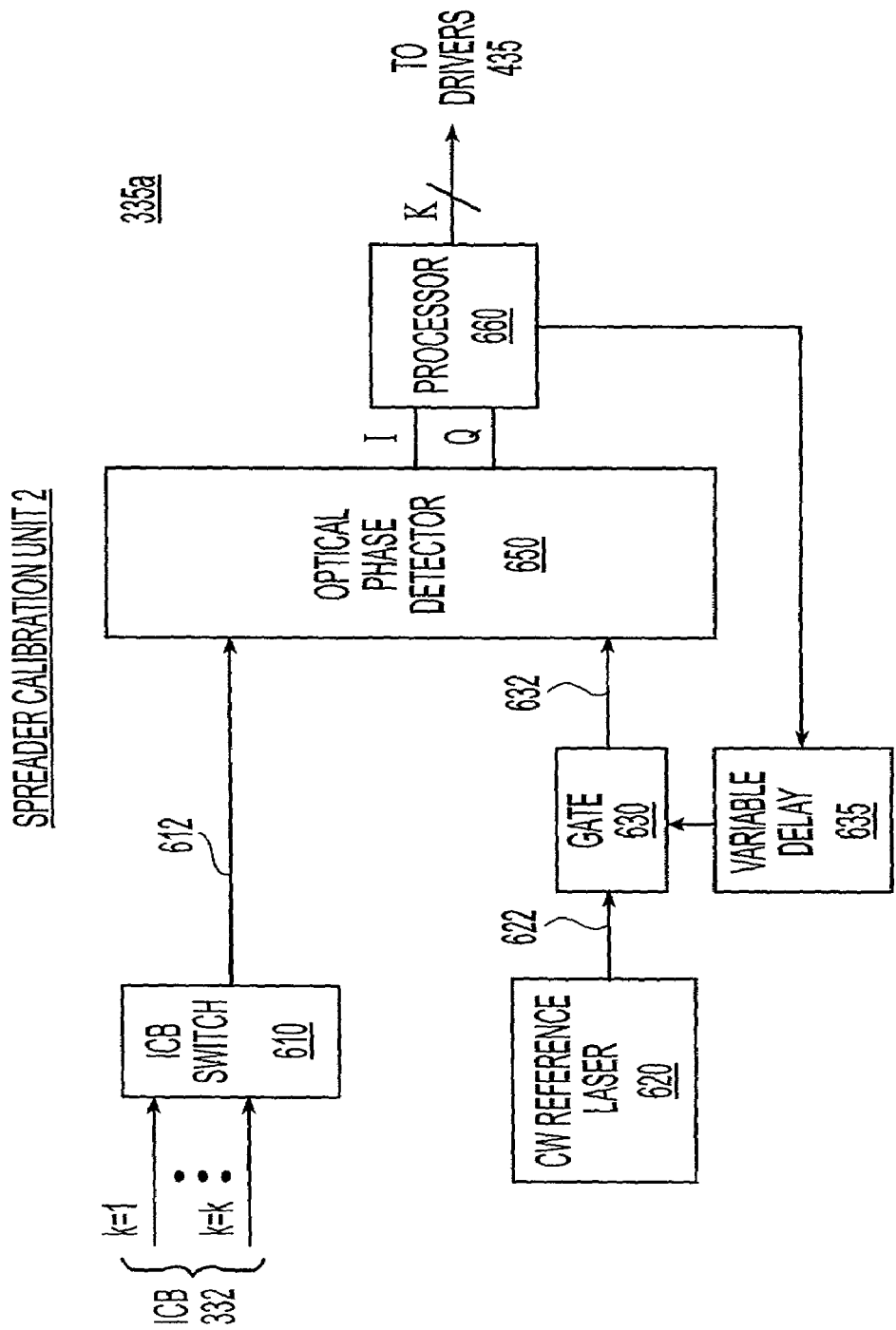
FIG. 6 is a block diagram of a second embodiment of a spreader calibrator.

FIG. 6 is a block diagram of another embodiment of a spreader calibration unit. In spreader calibration unit 335a, an imprinted code beam (ICB) switch 610 selects one of the K imprinted code beams from the pulse spreader 330 and directs the selected imprinted code beam 612 into an optical phase detector 650. A continuous-wave (CW) reference laser 620 generates a reference light beam 622 that is directed into the phase detector 650 after gate 630. The gate may be implemented by a Mach-Zehnder intensity modulator or the like. The gate 630 allows the reference light beam 622 to pass through the gate 630 to the phase detector 650 only during a selected chip period. The selected chip period is determined by variable electronic delay 635, which is controlled by processor 660. The phase detector 650 determines the amplitude product of, and the phase difference between, the selected imprinted code beam 612 and the gated reference beam 632. The amplitude product and phase difference are passed to a processor 660 that determines the offset that should be applied by the (kp)-th chip modulation circuit.

Figure 7:
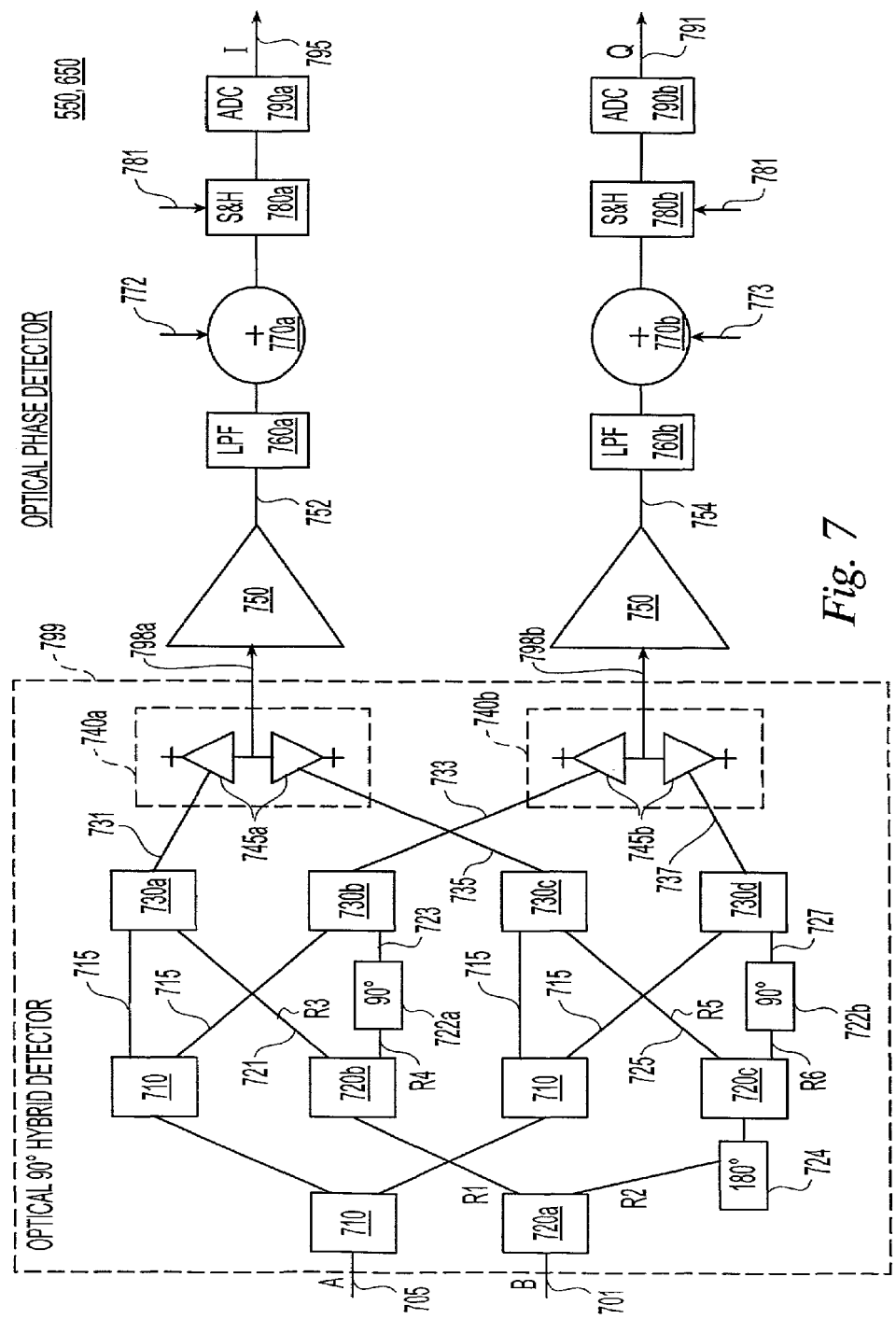
FIG. 7 is a block diagram of the transmitter-side optical phase detector in a preferred embodiment of the present invention.

FIG. 7 presents a block diagram of the optical phase detector 550, 650, seen in FIGS. 5 and 6. The optical phase detector receives two optical beams 705, 701 and generates two electrical signals 795, 791 corresponding to the in-phase and quadrature components of the multiplication of 705 by the complex conjugate of 701. One of the two beams, designated as A in FIG. 7, is referred to as a signal beam. The second optical beam 701, designated as B in FIG. 7, is referred to for convenience as a reference beam in this description of the optical phase detector. It should be kept in mind, however, that the 'reference beam' 701 may be something other than an unmodulated train of pulses having no information.

The signal beam 705 is split into four beams identified by 715 in FIG. 7. In a referred embodiment, the signal beam 705 is split into four beams by a cascade of 1:2 splitters 710. In another embodiment, the signal beam 705 may be directly split into four beams by a single 1:4 splitter. Regardless of how they are formed, the four signal beams 715 are directed into four 2:1 combiners 730a, 730b, 730c, and 730d.

The reference beam 701 is first subjected to a 1:2 splitter 720a to form identical beams R1 and R2. Beam R1 is then subjected to a second 1:2 splitter 720b to form identical beams R3 and R4. Meanwhile, Beam R2 is first subjected to a 180° phase shifter 724 before being spilt by 1:2 splitter 720c to thereby form identical beams R5 and R6. Beam R3 is input as signal 721 to combiner 730a while beam R4 is first subjected to a first 90° phase shifter 722a before being input to combiner 730b as signal 723. Beam R5 is input as signal 725 to combiner 730c while beam R4 is first subjected to a second 90° phase shifter 722b before being input to combiner 730d as signal 727.

The resulting beams R3, R4, R5 and R6, represented as signals 721, 723, 725, and 727 are phase-shifted by 90° increments. Beam R3/721 has zero phase shift and is combined with one of the four signal beams 715 in 2:1 combiner 730a to produce first combined beam 731 that is the sum of the signal and reference beam, designated as A+B. Beam R4/723 has a 90° phase shift and is combined with one of the four signal beams 715 in second 2:1 combiner 730b to produce second combined beam 733 that is designated as A+jB. Beam R5/725 has a 180° phase shift and is combined with one of the four signal beams 715 in third 2:1 combiner 730c to produce third combined beam 735 that is the difference between the signal beam and reference beam and is designated as A−B. Finally, beam R6/727 has a 270° phase shift and is combined with one of the four signal beams 715 in fourth combiner 730d to produce fourth combined beam 737 that is designated as A−jB.

The first and third combined beams 731, 735 are input to a first matched detector 740a. The first matched detector 740a includes light sensors 745a, to thereby generate electrical signals 798a that are proportional to the intensity difference between the first and third combined beams 731, 735. The light sensors 745a are preferably photoelectric detectors such as p-n, p-i-n, or Schottky-barrier photodiodes, and are selected to generate substantially identical electrical signals for the same incident light beam. The electrical signals 798a generated by the first matched detector 740a are input to a first amplifier 750a. The output signal 752 of the first amplifier 750a is proportional to the in-phase difference between the signal beam 705 and the reference beam 170 (real{AB*}).

The second and fourth combined beams 733, 737 are directed to a second matched detector 740b comprising matched light sensors 745b, to thereby generate electrical signals that are proportional to the intensity difference between the second and fourth beams 733, 737. The electrical signals 798b generated by the second matched detector 740b are input into a second amplifier 750b. The output signal 754 of the second amplifier 750 is proportional to the quadrature phase difference between the signal beam 705 and the reference beam 701 (imag{AB*}). The splitters, phase shifters, combiners and detectors together comprise an optical 90° hybrid detector 799 that outputs the signals 798a, 798b.

The analog output from the amplifiers 750a, 750b are input to low pass filters 760a, 760b, respectively. The output of the lowpass filters is then subject to dc bias adjustment 770a, 770b based on bias signals 772, 773, respectively, provided by a controller (not shown) which estimates signal energy. The filtered and bias-adjusted analog signals I' and Q' on lines 775, 777, respectively, are converted to digital form by sample and hold ("S&H") units 780a, 780b, respectively, which are timed by synchronization input 781. The output of the sample and hold units is sent on to analog-to-digital converters 790a, 790b, to form the in-phase I 795 and quadrature Q 791 signals which are subject to further processing, as is known to those skilled in the art.

Data Modulator

Figure 8:
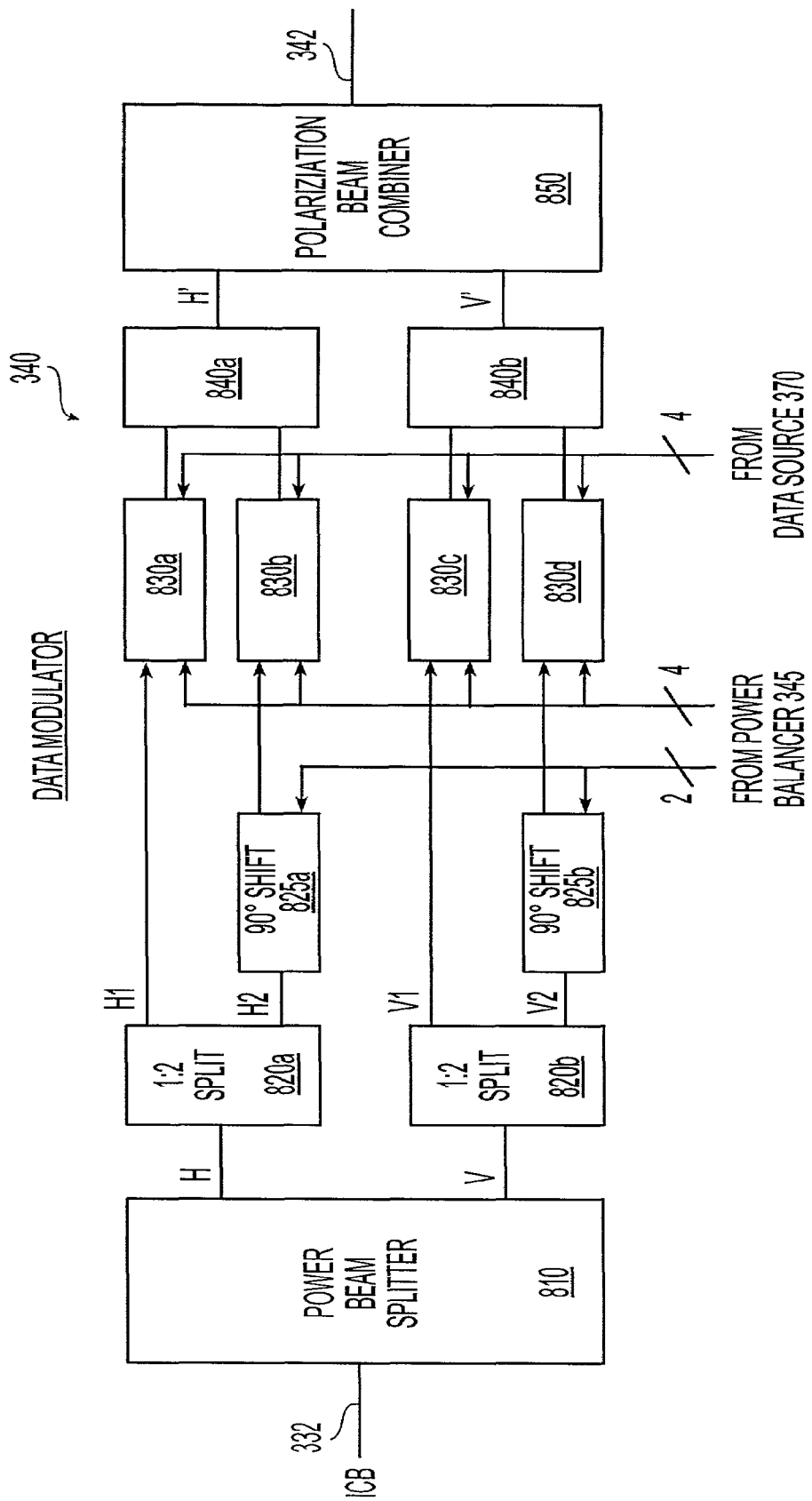
FIG. 8 is a block diagram of the data modulator in a preferred embodiment of the present invention.

FIG. 8 is a block diagram of a preferred embodiment of a data modulator 340 in accordance with the present invention. The imprinted code beam 332 from pulse spreader 330 enters the data modulator 340 through a power splitter 810. The power splitter 810 splits the imprinted code beam 332 into two beams, designated as H and V. The H and V beams are each directed into separate 1:2 splitters 820a, 820b, although a 1:4 splitter may be used instead. The splitter 820a splits the H beam into H1 and H2 components and directs one of these (H2 in FIG. 8), into a 90° phase shifter 825a. Similarly, the splitter 820b splits the V beam into V1 and V2 components and directs one (V2 in FIG. 8) into a 90° phase shifter 825b.

Each of the four component beams are directed into a separate modulator 830a, 830b, 830c, 830d where the data stream 370 is modulated on the four component beams. As discussed above, the data stream $DATA_{ijk}$ includes data to be encoded on the H and V polarizations of a single code word, depending on the index 'j'. Thus, the data input to modulators 830a, 830b is the data corresponding to j='H' and the data input to modulators 830c, 830d is the data corresponding to j='V'.

Control signals from a power balancer 345 ensure that the intensity of each data-modulated component beam is comparable to that of the others and ensures the orthogonality of the in-phase and quadrature components of the constellation. Thus, the power balancer may have inputs into one or both of the phase shifters 825a, 825b and the data modulators 830a, 830b, 830c, 830d.

In a preferred embodiment, each of the four component beams is modulated with one bit. The modulators 830a, 830b, 830c, 830d are each implemented as a Mach-Zehnder Interferometer (MZI), each applying an amplitude of 1 or −1 (00 or 180° phase shift) to the component beam depending on whether the bit state is a 0 or 1. In a preferred embodiment, the data is encoded in the changes of phase between one bit to the other, referred to as differential quadrature phase shift keying (DQPSK). As will be clear to one of skill in the art, the 90° shift may be applied after the bit modulator 830. As will also be clear to one of skill in the signal processing arts, the modulator 830 may also be a phase modulator or a multilevel amplitude modulator thereby allowing any amplitude/phase modulation and encoding of a higher number of bits per symbol.

The modulated H1 and H2 component beams are combined in a first combiner 840a to form a data-modulated beam H'. Similarly, the modulated V1 and V2 component beams are combined in a second combiner 840b to form a data-modulated beam V'. The data-modulated beams H' and V' are then combined in a polarization beam combiner 850 that rotates the polarization plane of the H'-beam 90° to the polarization plane of the V'-beam and combines both beams into the data beam 342. The combined H' and V' beams do not interfere because of their orthogonal polarization planes.

As will be clear to one of skill in the optical arts, the polarization state of H' and V' beams may also be converted to any two orthogonal polarizations (such as right circularly polarized beam and a left circularly polarized beam) before combining into the data beam and still maintain the orthogonality condition that prevents interference between the two beams.

Receiver

Figure 9A:
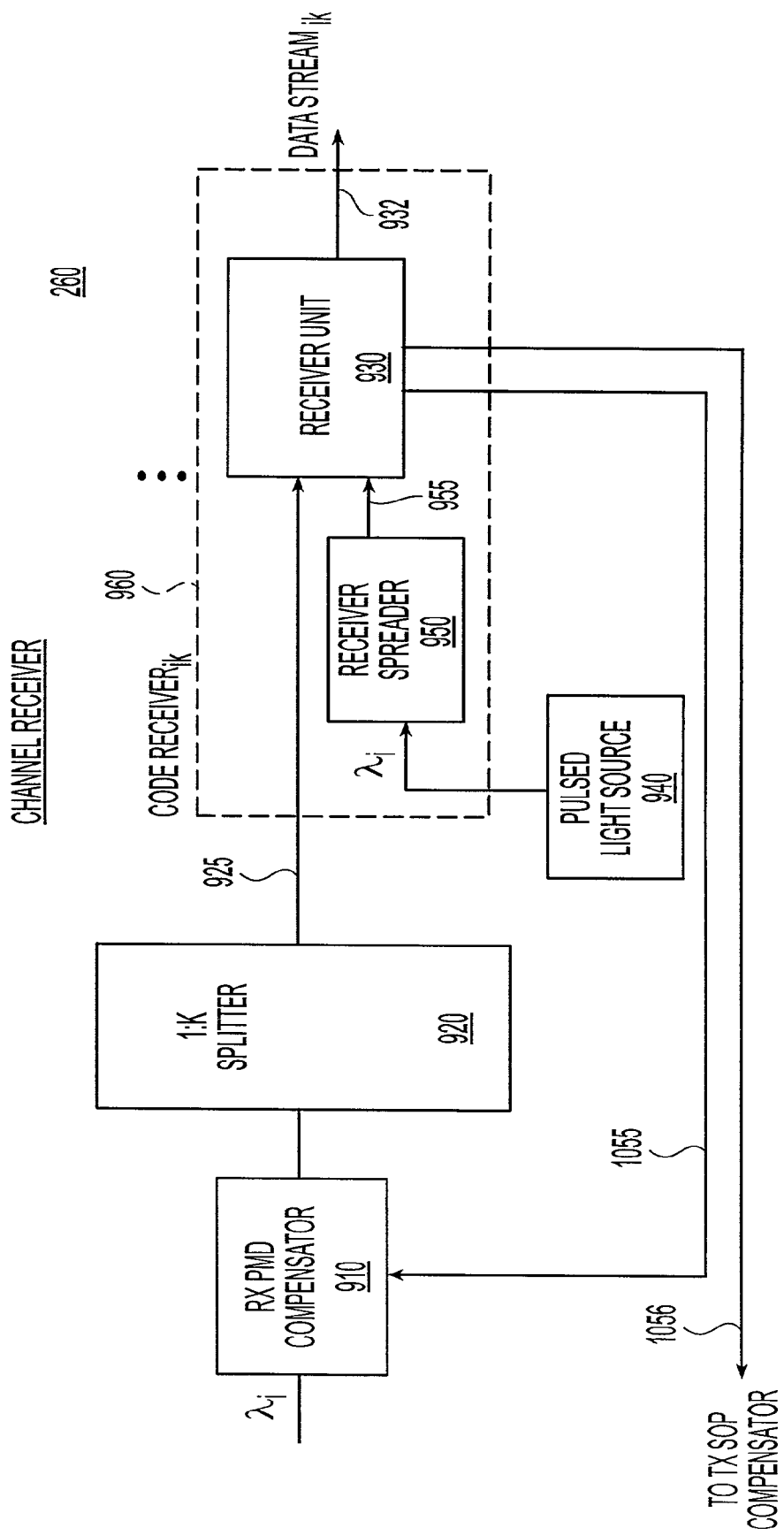
FIG. 9a is a block diagram of the channel receiver in accordance with one embodiment of the present invention.

FIG. 9a is a block diagram of one embodiment of channel receiver 260 in accordance with the present invention. After demultiplexing by the DWDM demultiplexer 230, each channel beam, indicated by $\lambda_i$ in FIG. 9a, is directed into its own channel receiver 260 where the K data streams are recovered and converted into electrical signals for downstream processing. The channel beam first is directed into an Rx PMD compensator 910. The Rx PMD compensator 910 adjusts the polarization state of the channel beam to compensate for PMD distortions to the channel beam during transmission of the channel signal through the optical fiber.

In a preferred embodiment, the Rx PMD compensator 910 is the Acrobat™ Polarization Control Module (PCM) from Corning Incorporated of Corning, N.Y. The PolarRITE™II Polarization Controller from General Photonics Corporation of Chino, Calif. may also be used as the Rx PMD compensator 910. As seen in FIG. 9*a*, the Rx PMD compensator 910 receives controls signals 1055 from the receiver unit circuitry 930 which performs the functions of data extraction and PMD control, as discussed further below.

The compensated channel beam is directed into a 1:K splitter 920. The splitter 920 splits the compensated channel beam into K split beams 925. Each of the K split beams 925 are directed into a code receiver 960. Each code receiver 960 is configured to recover one of the K data-modulated codes from the split beam 925 and convert the data-modulated code into an electrical signal corresponding to the data stream 932. For purposes of clarity, only one code receiver is shown in FIG. 9*a* and it should be understood that the channel receiver 260 has a separate code receiver 960 for each of the K data streams in the channel signal.

Pulsed light source 940 is substantially similar to pulsed light source 310 at the transmitter, and can actually be tapped from source 310 in the "duplex" node arrangement of FIG. 2*b*. Pulse light source 940 generates a reference optical signal, characterized by $\lambda_i$. The reference optical signal is directed into the receiver pulse spreader 950 of each of the code receivers 960.

The structure and operation of the receiver pulse spreader 950 is substantially the same as the pulse spreader 330 described with respect to FIG. 4 with the amplitude scaling $1/a_{kp}$ instead of $a_{kp}$. Thus, the receiver pulse spreader 950 has an associated calibration unit (not shown) which operates in a manner similar to that described with respect to spreader calibration units 335 or 335*a*. The receiver pulse spreader 950 modulates the reference optical signal to produce a reference imprinted code beam 955 corresponding to one of the K imprinted code beams used to carry the K data steams in the channel signal. The reference imprinted code beam 955 is directed into the receiver unit 930, and the optical detection circuitry 1090 and the demodulation circuitry 1060 within the receiver unit 930 recovers the data stream 932 from the channel signal 925 corresponding to the reference imprinted code beam 955.

The PMD controller portion 1050, 1050*b* within receiver unit 930, has an associated DSP which outputs a PMD compensator signal 1055 which is fed back to the Rx PMD compensator 910 (depicted in FIGS. 2*a* & 2*b* as '280'), and a SOP compensator signal 1056 which is sent to the transmitter over auxiliary channel 290.

Receiver Unit

Figure 10:
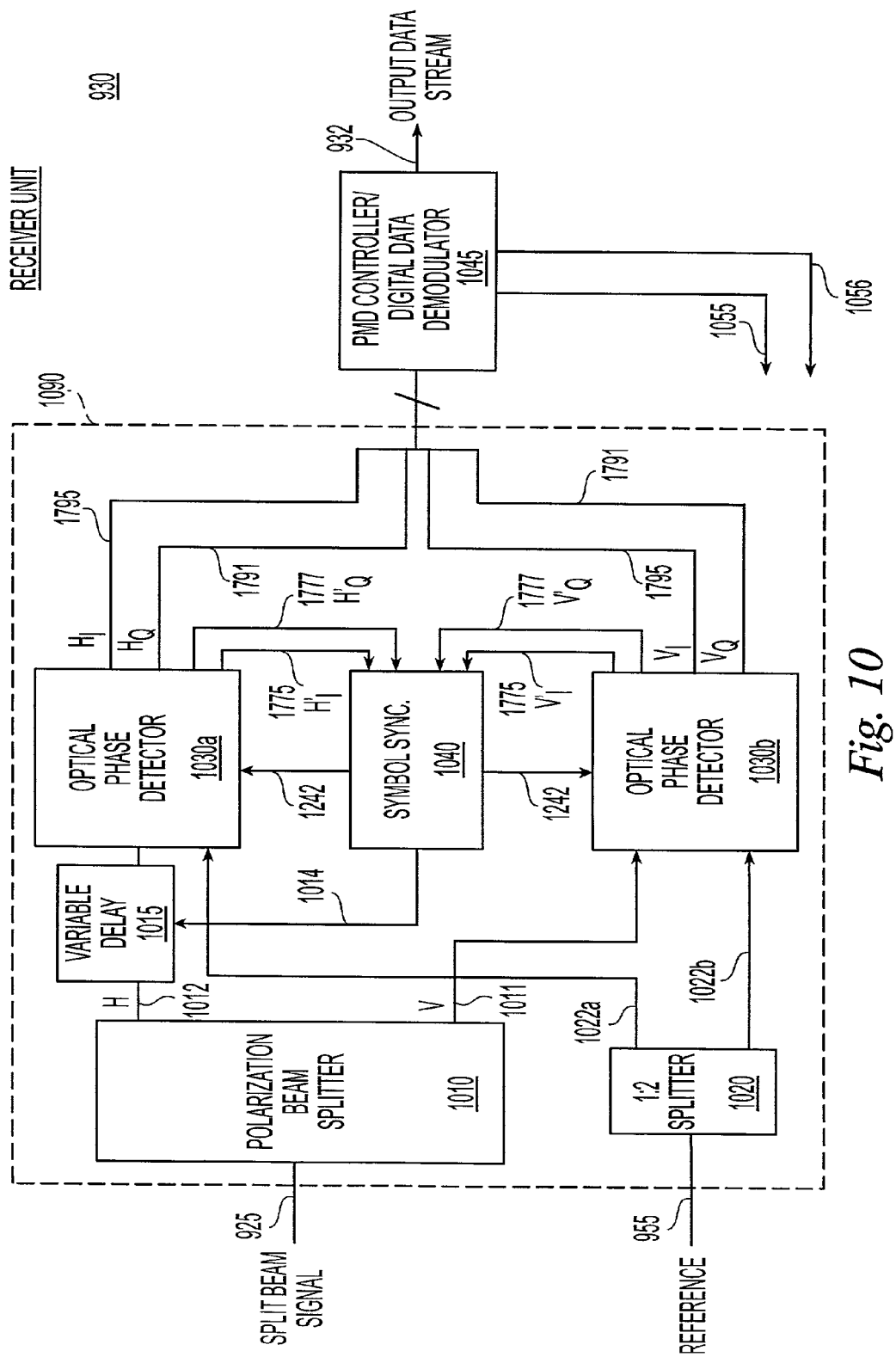
FIG. 10 is a block diagram of the data demodulator in a preferred embodiment of the present invention.

FIG. 10 is a block diagram of one embodiment of the receiver unit 930 seen in FIG. 9*a*. This unit 930 employs homodyne detection. A split beam signal 925 is directed into a polarizing beam splitter 1010 of the optical detection circuitry 1090. The polarizing beam splitter 1010 splits the split beam 925 into its first and second orthogonal polarization components, designated as H and V in FIG. 10.

The H-beam 1012 is directed to a variable delay 1015 controlled by a delay signal 1014 from a symbol synchronizer 1040. The variable delay 1015 delays the H-beam to synchronize the H-beam to the V-beam 1011 so that the H-beam and V-beam comprising the same symbol appear at the demodulator at the same time (alternatively, the inverse delay can be applied to the V-beam). The delayed H-beam is directed into a first optical phase detector 1030*a*. The V-beam 1011 is directed into a second optical phase detector 1030*b*. Reference imprinted code beam 955 corresponding to one of the K codes entering the receiver unit 930 is split by a 1:2 power splitter 1020. The split reference code beams 1022*a*, 1022*b* are directed into optical phase detectors 1030*a*, 1030*b*, respectively.

Optical phase detector 1030*a* generates a pair of digital signals $H_i$, $H_Q$, which represent the in-phase and quadrature components of the H beam. Optical phase detector 1030*a* also generates a pair of analog signals $H'_i$, $H'_Q$, which represent the analog versions of $H_i$, $H_Q$ from which the digital signals were formed. Similarly, optical phase detector 1030*b* generates a corresponding pair of digital signals $V_i$, $V_Q$, which represent the in-phase and quadrature components of the V beam, and the associated analog signals $V'_i$, $V'_Q$. The timing of the phase detectors 1030*a*, 1030*b* are controlled by a timing signal 1242 from the symbol synchronizer 1040.

The four analog signals $H'_i$, $H'_Q$, $V'_i$, $V'_Q$ are input into the symbol synchronizer 1040 and the digital signals $H_i$, $H_Q$, $V_i$, $V_Q$, are input into the PMD controller/digital data demodulator circuit 1045. The data and the PMD control signals are ultimately extracted from the digital signals, while symbol synchronization is performed using the analog signals.

The PMD controller 1050 receives the digitized I and Q components of the H and V polarizations and output the polarization control signals in response thereto. The PMD controller 1050 (see FIG. 10*a*) determines the amount of PMD the optical signal has experienced and provides a compensation signal 1055 to the PMD compensator 910. The four signals are further digitally processed in the digital data demodulator 1060 to recover the data stream 932. As will be clear to one of skill in the signal processing art, the digital data demodulator 1060 may include components such as an equalizer, differential demodulation, frequency compensation and symbol timing recovery. In a preferred embodiment, the components are implemented as algorithms/computer programs executing on a DSP, FPGA, ASIC or other processor known, to one of skill in the signal processing art.

Figure 10A:
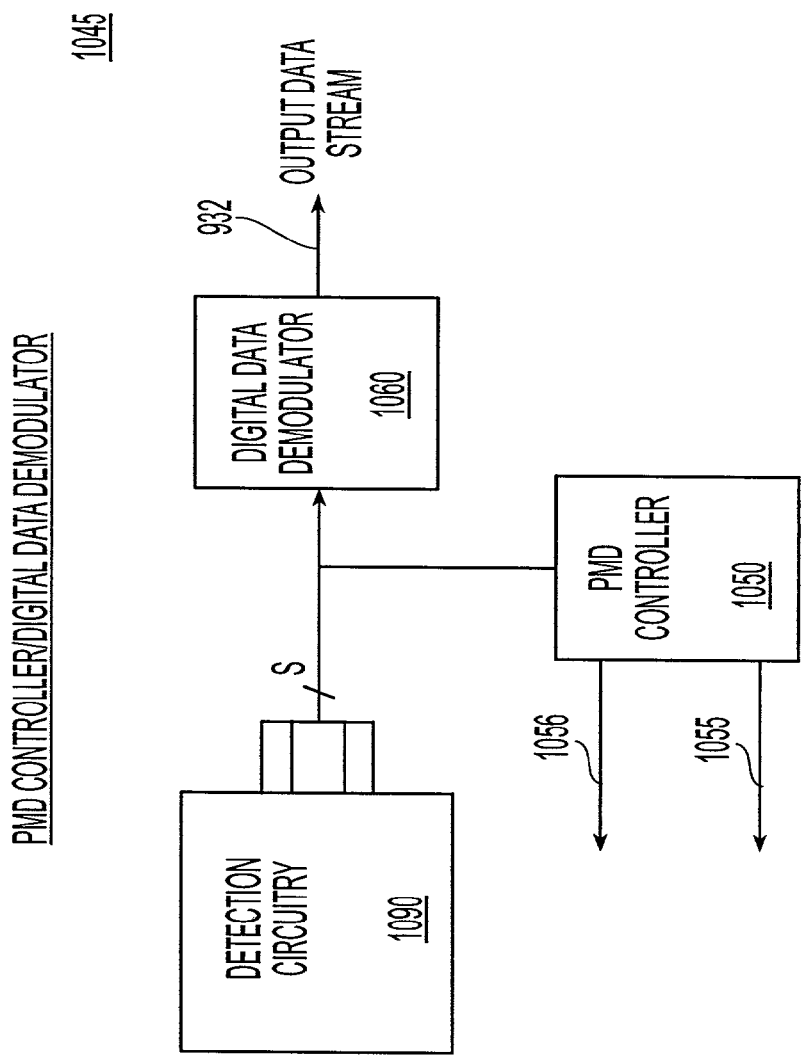
FIG. 10a depicts one configuration for a PMD compensator/digital data demodulator circuit.

FIG. 10*a* shows a conceptual configuration of data flow in a PMD controller/digital data demodulator circuit 1045 used in conjunction with a receiver having a receive signal PMD compensator 910 at the receiver front end, such as seen in the receiver 260 of FIG. 9*a*. As discussed above, the optical detection circuitry 1090 outputs the I and Q components of the H and V polarizations of the incoming signal 925. In FIG. 10*a*, the output S of the optical detection circuitry 1090 represents the digital signals $H_i$, $H_Q$, $V_i$, $V_Q$, which have already been PMD compensated. These four signals are input into both the digital data demodulator 1060 and also to the digital PMD controller 1050. The PMD controller, in turn, outputs a PMD controller signal 1055 which is fed to the receiver's PMD compensator 910, and also outputs a SOP controller signal 1056 which is fed back to the transmitter's SOP compensator. Thus, the shown digital polarization compensator system provides feedback to both the receiver input and the transmitter output. And, as stated above, the digital PMD controller 1050 and the digital data demodulator 1060 are preferably implemented as algorithms in computer software.

Figure 10B:
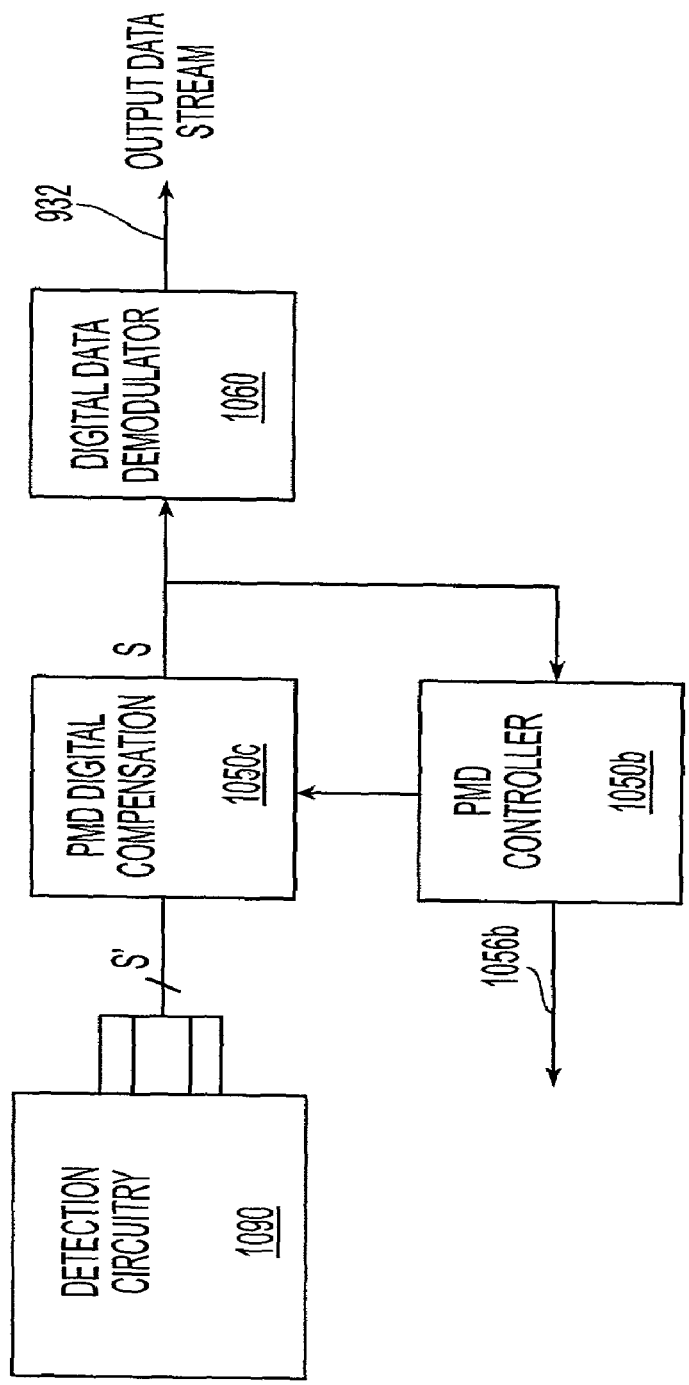
FIG. 10b depicts a second configuration for a PMD compensator/digital data demodulator circuit.

FIG. 10*b* shows a conceptual configuration of data flow in a PMD controller/digital data demodulator circuit 1045 of the sort used with a receiver having back-end digital PMD compensation 1050*c*, instead of an input PMD compensator 910, as seen in FIG. 9*a*. In this instance, the uncompensated digital output S' of the optical detection circuitry 1090 is first subject to digital PMD compensation to thereby produce a PMD compensated digital signal S. The signal S is then input to a digital PMD compensation controller 1050b which performs the necessary calculations and adjustments to provide the needed digital PMD compensation. It is understood that the configuration in FIG. 10b is used with a receiver not having a front-end PMD compensator, and so no signal 1055 is provided to a compensator device such as the aforementioned Acrobat™ Polarization Control Module (PCM). However, in the configuration of FIG. 10b, one may optionally still have a signal 1056b that is sent back to the transmitter 250 for transmitter-end SOP compensation.

Figure 9B:
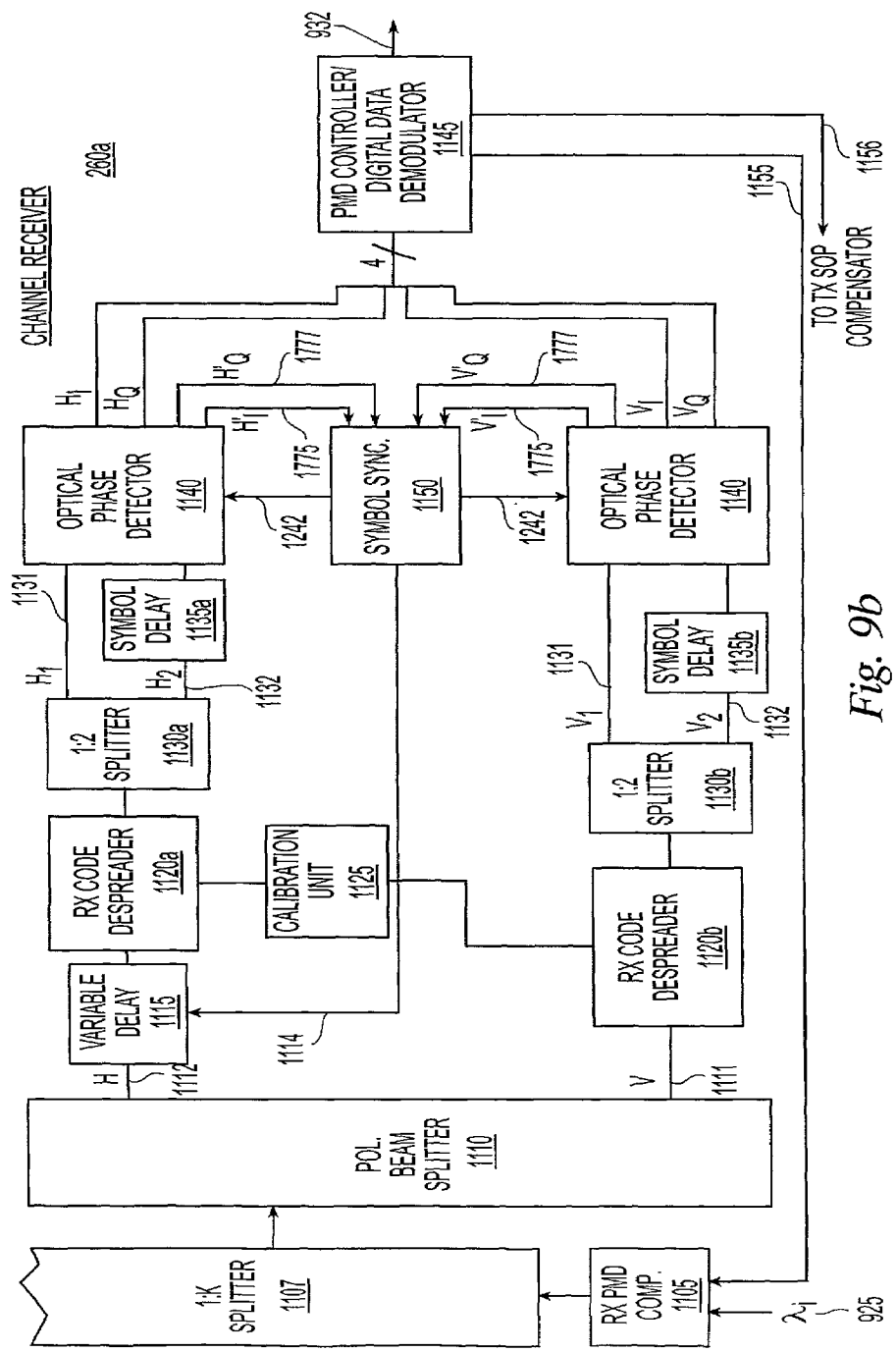
FIG. 9b is a block diagram of the channel receiver in accordance with another embodiment of the present invention.

FIG. 9b is a block diagram of another embodiment of a channel receiver suitable for use with the present invention. Channel receiver 260a employs self-homodyne detection, thereby obviating a need for a pulsed light source 940 of the sort used in channel receiver 206.

The incoming channel beam 925 is first input to a receiver-end PMD compensator 1105 and resulting compensated signal is input to a 1:K splitter 1107 to create K identical compensated signals, one for each code word. Each of these is then split by a polarizing beam splitter 1110 into two beams having orthogonal polarization states designated by H and V in FIG. 9b. It should be kept in mind that since the 1:K splitter 1107 is a linear device, it may instead be positioned either before the PMD compensator 1105 or the polarization beam splitter 1110.

The H-beam 1112 is directed to a variable delay 1115 controlled by a signal 1114 from the symbol synchronizer 1150. The variable delay 1115 delays the H-beam so as to synchronize the H-beam to the V-beam 1111 so that the H-beam and V-beam comprising the same symbol appear at the demodulator at the same time. It should be understood that one may instead delay the V beam instead of the H beam.

The polarized H and V beams 1112, 1111 are first directed into despreaders 1120a, 1120b, respectively, which leave the H and V beams only with phase information of the data used to modulate the code word for which the despreaders 1120a, 1120b are attuned. After despreading, the H beam is subjected to a first 1:2 splitter 1130a, to form identical beams H1 and H2, represented as signals 1131a, 1132a, respectively. After despreading, the V beam is subjected to a second 1:2 splitter 1130b to form identical beams V1 and V2, represented as signals 1131b, 1132b, respectively. Beams H2 and V2 and are directed into symbol period delay circuits 1135a, 1135b, respectively, to thereby delay H2 and V2 by one symbol period. Beam H1 and one-symbol-period-delayed beam H2 are then input to a first optical phase detector 1140a, while beam V1 and one-symbol-period-delayed beam V2 are input to a second optical phase detector 1140b. Thus, the optical phase detectors 1140a and 1140b will output information about the symbol-to-symbol phase difference, which is useful in differential phase shift keying (DPSK).

The two optical phase detectors 1140a, 1140b output four digital signals designated as $H_i$, $H_Q$, $V_i$, and $V_Q$ that represent the in-phase and quadrature information of the H and V-beams. They also generate the four analog signals $H'_i$, $H'_Q$, $V'_i$, and $V'_Q$, that correspond to the digital signals. The timing of the phase detectors 1140a, 1140b is controlled by a timing signal 1242 from the symbol synchronizer 1150. The four digital signals are input to the PMD controller/digital data modulator 1145, much as discussed above with respect to the device 1045 of FIG. 10.

The structure of the Rx code despreaders 1120a 1120b, is substantially the same as the pulse spreader 330 shown in FIG. 4. The principle difference between an Rx code despreader 1120a, 1120b and the pulse spreader 330 is in the amplitude scaling and modulation applied to the pulse beam. For the k-th code despreader, the delay for the p-th chip, $\tau_p^*$, is the complement of the delay for the p-th chip in the k-th pulse spreader, $\tau_p$. Similarly, the Rx despreader phase shift, $\delta_{kp}^*$, is the conjugate phase shift applied by the pulse spreader 330 and the despreader amplitude, $a_{kp}^*$, is inverse of the amplitude scaling applied by the pulse spreader 330. The despreader delays and modulations are given by the equations:

$$\tau_p^* = T - \tau_p \quad (2)$$

$$\delta_{kp}^* = -\delta_{kp} \quad (3)$$

$$a_{kp}^* = 1/a_{kp} \quad (4)$$

Thus, within the K pairs of despreaders, each despreader 1120a, 1120b belonging to k-th pair is attuned to the k-th code word. As discussed above, the polarized H and V beams 1112, 1111 contain the entire code division multiplexed optical signal comprising all K orthogonal code words modulated with data. When the H and V beams 1112, 1111 enter the k-th pair of despreaders, the output of that pair of despreaders is only the phase of the data modulated on the k-th code word, present at a known location within the symbol. This is because the k-th pair of despreaders counters the code modulation of the k-th code word, leaving only the phase of the data modulation in a known position (due to the time-shifting of the time chips brought about by delay for the p-th chip, $\tau_p^*$), while the remaining K−1 code words, being orthogonal to the k-th code word, more or less cancel out.

The despreaders 1120a, 1120b are calibrated by calibration unit 1125 which operates in a manner similar to that described with respect to spreader calibration units 335 or 335a.

In the preferred embodiment using the coding scheme described by equation (1), the despreader delay and modulation for code k is identical to the pulse spreader delay and modulation for code k. In a preferred embodiment, the upstream channel transmitter may be integrated with the downstream channel receiver and vice versa. In such a situation, the imprinted code beams 322 generated by the pulse spreader 330 for the upstream transmitter may be used as the K reference code beams. For a generalized coding scheme encompassed by the present invention allowing both phase and amplitude modulation, however, the despreader may not be identical to the pulse spreader.

Figure 11:
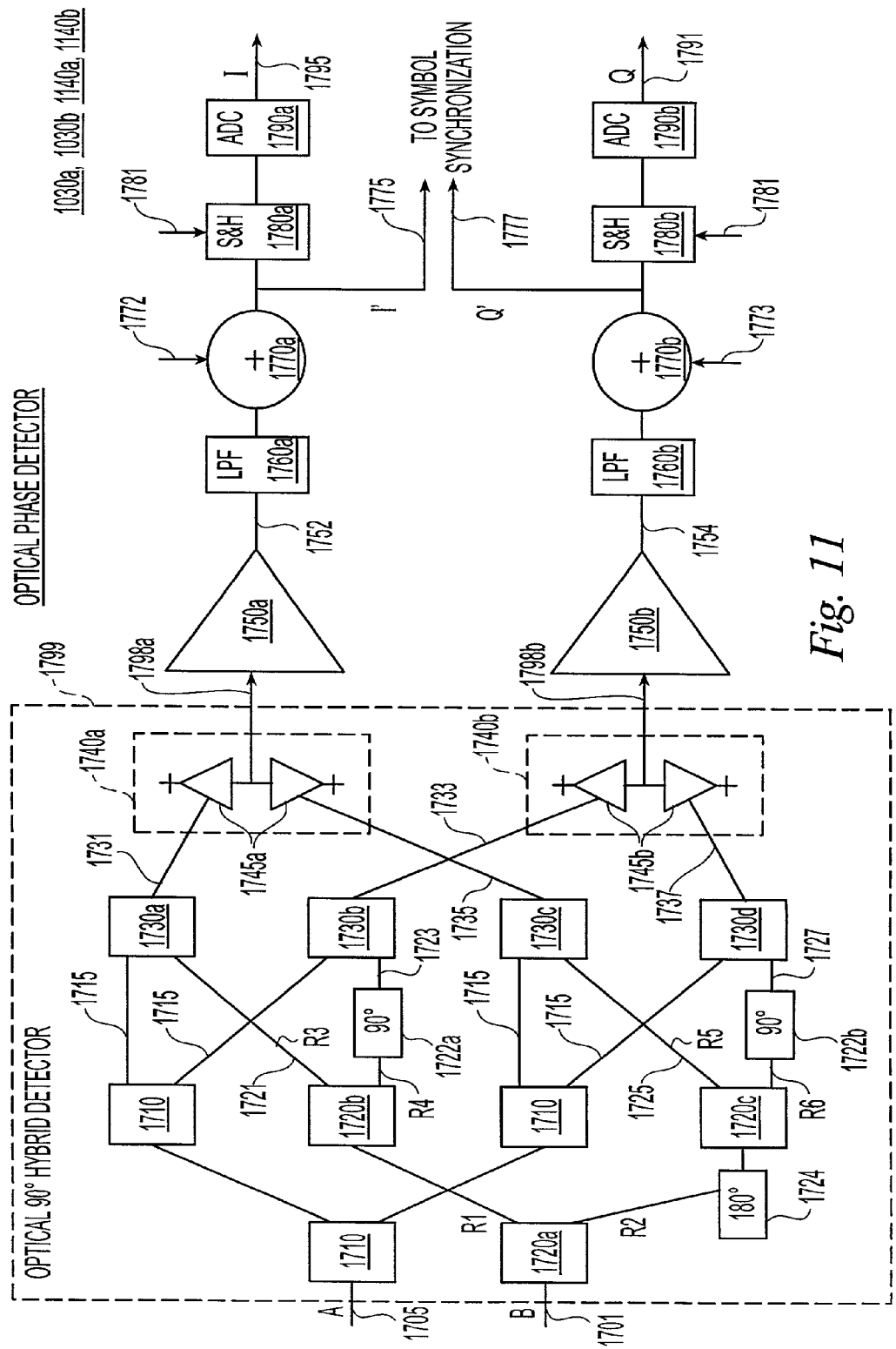
FIG. 11 is a block diagram of the recevier-side optical phase detector in a preferred embodiment of the present invention.

FIG. 11 is a block diagram of the optical phase detectors 1030a, 1030b seen in the optical detection circuitry 1090 of FIG. 10 and the optical phase detectors 1140a, 1140b seen in the channel receiver 260a of FIG. 9b. The phase detector receives two optical beams 1705, 1701 and outputs generates two electrical signals 1795, 1791 corresponding to the in-phase and quadrature components of the signal beam. One of the two beams, designated as A in FIG. 7, is a signal beam. The second optical beam 1701, designated as B in FIG. 11, is a reference beam.

The signal beam 1705 is split into four beams identified by 1715 in FIG. 11. In a preferred embodiment, the signal beam 1705 is split into four beams by a cascade of 1:2 splitters 1710. In another embodiment, the signal beam 1705 may be directly split into four beams by a single 1:4 splitter. Regardless of how they are formed, the four signal beams 1715 are directed into four 2:1 combiners 1730a, 1730b, 1730c, and 1730d.

The reference beam 1701 is first subjected to a 1:2 splitter 1720a to form identical beams R1 and R2. Beam R1 is then subjected to a second 1:2 splitter 1720b to form identical beams R3 and R4. Meanwhile, Beam R2 is first subjected to a 180° phase shifter 1724 before being spilt by 1:2 splitter 1720c to thereby form identical beams R5 and R6. Beam R3 is input as signal 1721 to combiner 1730a while beam R4 is first subjected to a first 90° phase shifter 1722a before being input to combiner 1730b as signal 1723. Beam R5 is input as signal 1725 to combiner 1730c while beam R4 is first subjected to a second 90° phase shifter 1722b before being input to combiner 1730d as signal 1727.

The resulting beams R3, R4, R5 and R6, represented as signals 1721, 1723, 1725, and 1727 are phase-shifted by 90° increments. Beam R3/1721 has zero phase shift and is combined with one of the four signal beams 1715 in 2:1 combiner 1730a to produce first combined beam 1731 that is the sum of the signal and reference beam, designated as A+B. Beam R4/1723 has a 90° phase shift and is combined with one of the four signal beams 1715 in second 2:1 combiner 1730b to produce second combined beam 1733 that is designated as A+jB. Beam R5/1725 has a 180° phase shift and is combined with one of the four signal beams 1715 in third 2:1 combiner 1730c to produce third combined beam 1735 that is the difference between the signal beam and reference beam and is designated as A−B. Finally, beam R6/1727 has a 270° phase shift and is combined with one of the four signal beams 1715 in fourth combiner 1730d to produce fourth combined beam 1737 that is designated as A−jB. Thus combiners 1730a, 1730b, 1730 and 1730d are configured to combine a copy of signal A with a copy of signal B shifted by 0°, 90°, 180° and 270°, respectively, to output first 1731, second 1733, third 1735 and fourth 1737 combined beams, respectively.

The first and third combined beams 1731, 1735 are input to a first matched detector 1740a. The first matched detector 1740a include light sensors 1745a, to thereby generate electrical signals that are proportional to the intensities of the first and third combined beams 1731, 1735. The light sensors 1745a are preferably photoelectric detectors such as p-n, p-i-n, or Schottky-barrier photodiodes, and are selected to generate substantially identical electrical signals for the same incident light beam. The electrical signals 1798a generated by the first matched detector 1740a are input to a first amplifier 1750a. The output signal 1752 of the first amplifier 1750a is proportional to the in-phase difference between the signal beam 1705 and the reference beam 1701.

The second and fourth combined beams 1733, 1737 are directed to a second matched detector 1740b comprising matched light sensors 1745b, to thereby generate electrical signals that are proportional to the intensities of the second and fourth beams 1733, 1737. The electrical signals 1798b generated by the second matched detector 1740b are input into a second amplifier 1750b. The output signal 1754 of the second amplifier 1750 is proportional to the quadrature phase difference between the signal beam 1705 and the reference beam 1701. The splitters, phase shifters, combiners and detectors together comprise an optical 900 hybrid detector 1799 that outputs the signals 1798a, 1798b.

The electrical signals 1798a, 1798b from the optical 900 hybrid detector 1799 are next input to a signal conditioning cascade circuit for comprising an amplifier, a low pass filter, DC bias removal, sample and hold circuitry and analog-to-digital converter. Signals 1798a, 1798b are first amplified by amplifiers 1750a, 1750b, respectively. The analog output from the amplifiers 1750a, 1750b are input to low pass filters 1760a, 1760b, respectively. The low pass filters preferably operate at 40 GHz. The output of the lowpass filters is then subject to dc bias adjustment 1770a, 1770b based on bias signals 1772, 1773, respectively, provided by a controller (not shown) which estimates signal energy. The filtered and bias-adjusted analog signals I' and Q' on lines 1775, 1777, respectively, are converted to digital form by sample and hold ("S&H") units 1780a, 1780b, respectively, which are timed by synchronization input 1781. The output of the sample and hold units is sent on to analog-to-digital converters 1790a, 1790b to form the in-phase I 1795 and quadrature Q 1791 signal which are subject to further processing, as is known to those skilled in the art.

The filtered and bias-adjusted analog signals I' and Q' on lines 1775, 1777, respectively, are also sent on to the symbol synchronization units 1040, 1150. Thus, the optical phase detector of FIG. 11 used in conjunction with the receiver is substantially similar to that shown in FIG. 7 for use on the transmitter side, with the exception of the analog taps for the symbol synchronization units.

Symbol Synchronization

Figure 12:
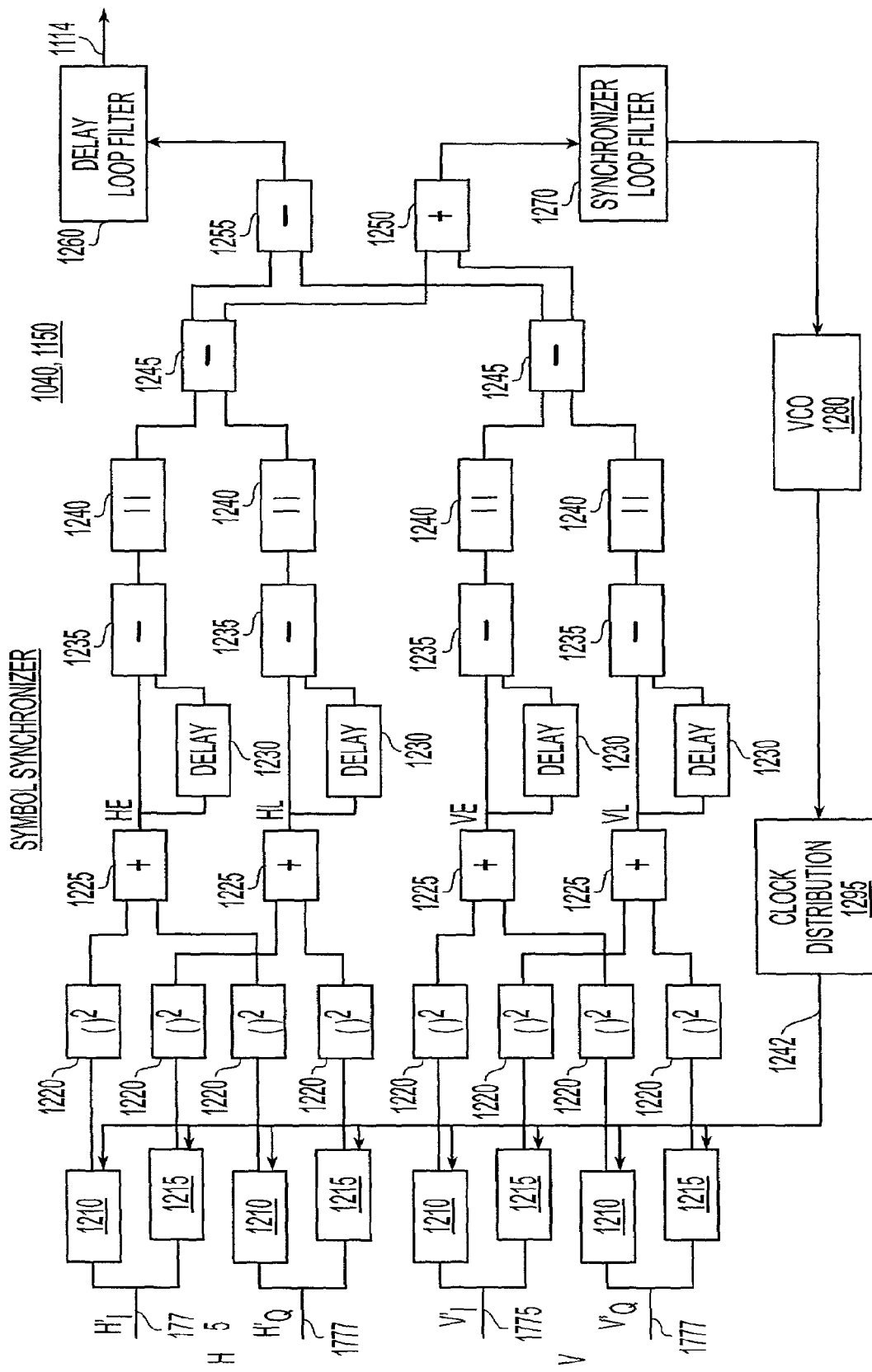
FIG. 12 is a block diagram of the symbol synchronizer in a preferred embodiment of the present invention.

FIG. 12 is a block diagram of a preferred embodiment of the symbol synchronization unit 1040/1150. Analog I' and Q' signals on lines 1775, 1777 from both the H and V optical phase detectors, representing both the in-phase and quadrature-phase components of the selected code beam, are each input into an early gate 1210 and a late gate 1215.

The early gate 1210 samples the signal a fraction of a symbol time before the S&H units 1780a, 1780b in the optical phase detector 1030a, 1030b/1140a, 1140b perform their sampling. Conversely, the late gate 1215 samples the signal a fraction of a symbol time after the S&H units in the optical phase detector perform their sampling. In a preferred embodiment, the magnitude of the time offsets for the early and late gates are identical and equal to T/5 where T is the symbol period.

Each gate 1210, 1215 comprises a sample & hold unit followed by an analog-to-digital converter, and is controlled by a clock signal from the clock distribution unit 1295. The signal from the clock distribution unit 1295 controls the sample & hold unit in each gate 1210, 1215 and determines the sampling instance of the input analog signals 1775, 1777 by each gate 1210, 1215. The analog-to-digital converter converts the analog sampled signal to digital format.

The in-phase and quadrature components from each of the gates 1210, 1215 are squared 1220 and summed 1225 to determine the symbol energy for each gate. The symbol energies are indicated in FIG. 12 as HE, HL, VE and VL where H and V designate the polarization states and E and L represent the early or late gate averages. The four symbol energies are input into separate delays 1230 and subtractors 1235. The delay 1230 delays the signal representing the symbol energy by one symbol period before sending the signal to the subtractor 1235. The subtractors 1235 determine the differences between the preceding symbol energies and the current symbol energies. The absolute value of the symbol-to-symbol energy difference is taken in 1240. The difference between the early gate and late gate energy difference is determined by subtractor 1245.

Averager 1250 averages the early/late gate symbol-to-symbol energy difference and inputs the output of the averager 1250 to a synchronizer loop filter 1270. The synchronizer loop filter 1270 controls a voltage controlled oscillator (VCO) 1280 that generates a timing signal 1242 that is distributed by a clock distribution unit 1295 to the early and late gates of the synchronizer and to the optical phase detectors.

Thus, with reference to FIG. 10, the symbol synchronizer 1040 receives the in-phase and quadrature components of the first and second orthogonal polarization components of split beam signal 925, and outputs a timing signal 1242 to help synchronize the symbol boundaries of the data-modulated codewords in the optical phase detectors 1030a, 1030b.

In the preferred implementation, the signal from the H and V channels are averaged to control a single VCO. In another implementation, only one channel is used to control the VCO. In yet another implementation, each of the channels may control a different VCO.

Subtractor 1255 determines the difference between the symbol-to-symbol energy differences from the H and V optical phase detectors. The difference between the H and V optical phase detectors is input into the delay loop filter 1260. The delay loop filter 1260 generates a control signal 1014/1114 to the H-beam variable delay 1015/1115 based on the symbol-to-symbol energy difference between the H and V optical phase detectors.

In the above implementation of the symbol synchronizer 1040, 1150, it is noted that the various computations are preferably performed in software by a DSP, ASIC or another, preferably programmable, processor.

Figure 13:
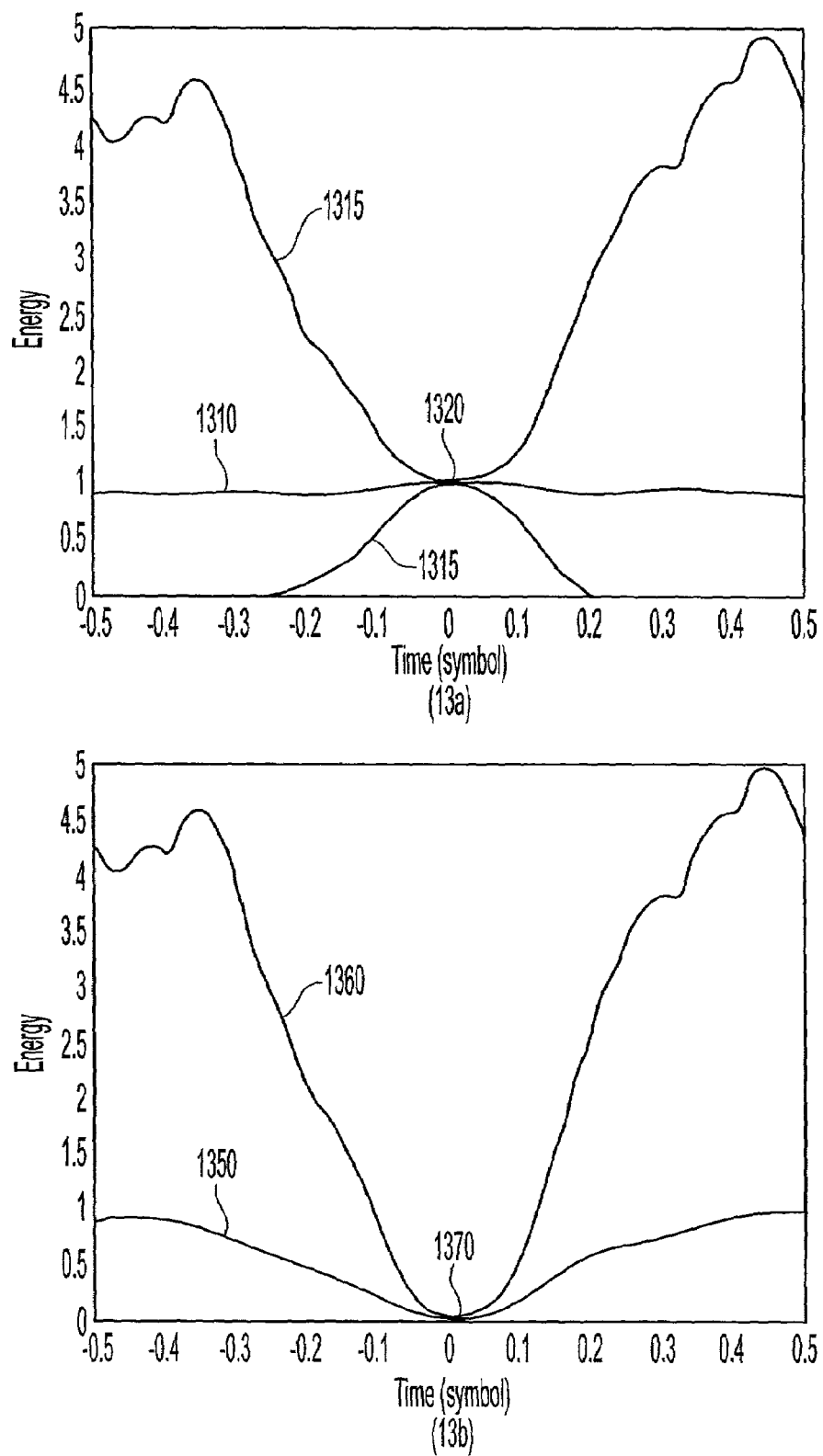
FIG. 13a is a graph of the average symbol energy as a function of the symbol time.
FIG. 13b is a plot of the average symbol-to-symbol energy difference as a function of the symbol time.

FIGS. 13a and 13b illustrate the advantage of using the symbol-to-symbol energy difference, instead of using just the symbol energy. FIG. 13(a) is a graph of the average symbol energy 1310 as a function of the normalized symbol time. A symbol time of zero corresponds to the beginning of a symbol. An energy envelope 1315 approximately indicates the variation that can be expected in the symbol energy measurement as a function of symbol time. The energy envelope exists because the signal still contains the signals from the other combined codes of the channel. The average symbol energy 1310 exhibits a slight maximum 1320 when the symbol time is synchronized to the symbol. The slight maximum makes it very difficult to locate the maximum in the symbol energy curve.

FIG. 13(b) is a plot of the average symbol-to-symbol energy difference 1350 as a function of the symbol time. An energy envelope 1360 approximately indicates the variation that can be expected in the symbol-to-symbol energy difference measurement as a function of symbol time. The average symbol-to-symbol energy difference 1350 exhibits a relatively deep minimum 1370 when the symbol time is synchronized to the symbol. The relatively deep minimum allows the loop filter to locate and keep the symbol time at the minimum 1370.

Polarization Compensation

Figure 14A:
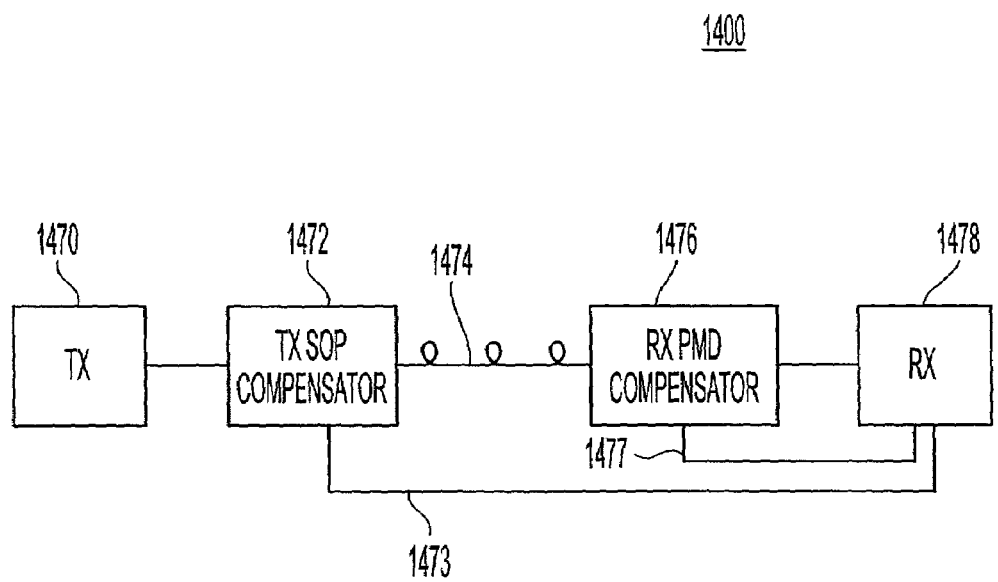
FIG. 14a is a block diagram of the transmitter-receiver link of the present invention.

FIG. 14a is a block diagram of a communication system 1400 that is able to adjust the SOP of the transmitted signal such that the transmitted signal is launched along the axes of the fiber 1474 associated with the minimum spreading of the received signal, while also compensating for the received PMD. In theory, the fiber exhibits two orthogonal eigenstates that are independent of frequency and fiber length. When the signal is launched along these eigenstates (fast and slow axes) of the fiber, PMD is limited to the differential group velocities of the two, and coupling of the signal's components traveling along each of the axes is zero. In practice, there are no such eigenstates for the long fiber, but for each optical frequency there exist two orthogonal input polarization states for which the output polarization states exhibit the least frequency dependence. Such states are called the principle state of polarization (PSP) of the fiber; the signal launched along the PSP exhibits the least coupling and therefore, the minimal temporal spreading. Due to environmental variations along the fiber with time, the PSP also varies with time and the variations should be tracked and compensated for.

The communication system 1400 includes a transmitter 1470 that directs the multiplexed and modulated optical signal to a transmitter polarization compensator 1472 that adjusts the transmitter SOP (Tx SOP) before launching the optical signal through the optical fiber 1474. At the receiver, a receiver polarization compensator 1476 adjusts the receiver SOP (Rx SOP) to optimize the selected metric. The receiver 1478 includes a PMD controller control both the receiver polarization compensator 1476 via signal line 1477 and the transmitter polarization compensator 1472 via a supervisory channel 1473 (represented by line 295 in FIGS. 2a and 2b and lines 1056, 1156 in FIGS. 9a, and 9b, respectively). The compensators 1472 and 1476 are discrete devices such as described above. The PMD controller may be implemented in hardware but in a preferred embodiment, the controller is implemented as a computer program executing on a processor such as a DSP.

Figure 14B:
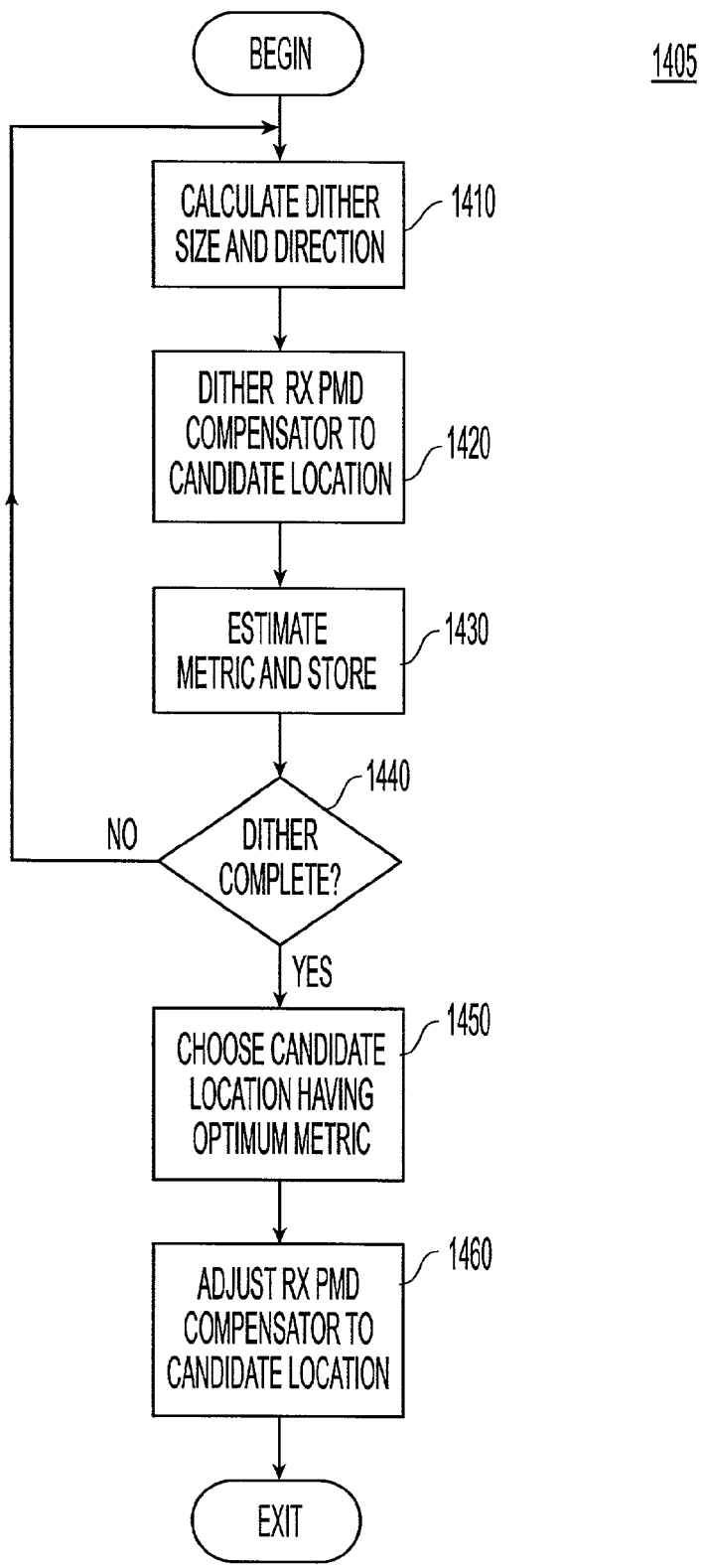

FIG. 14b presents a flow diagram 1405 describing the operation of the PMD controller Rx module for controlling the Rx SOP. The PMD controller dithers the receiver PMD compensator and executes a search to determine the compensation required to optimize some metric. In a preferred embodiment, the metric is the symbol signal-to-noise-ratio (SNR), and this is to be maximized. It should be noted, however, that one may instead use the error vector magnitude (EVM) as the metric, and minimize this. Other metrics may also be employed.

In step 1410, the dither step parameters, which include dither size and dither direction are established. The size and direction are established with respect to movement on the surface of a Poincare' sphere representing the receiver's SOP. The step directions are with respect to rotations, $\Delta\theta$ and $\Delta\epsilon$, about the H-V and P-Q axes, respectively. Each dither step comprises a pair of rotations. Each rotation can take three possible values ($\pm\Delta\theta$ and 0 for the H-V rotation and $\pm\Delta\epsilon$ and 0 for the P-Q rotation) resulting in a total of nine dither steps. Thus, establishing the dither step parameters entails selecting one from among nine candidate steps.

In step 1420, the receiver's PMD compensator is dithered by one of candidate steps by applying the proper set of rotations. In step 1430, the metric to be optimized is estimated by the controller and stored along with the state of the receiver PMD compensator 1476, the state being reflective of the candidate step that had just been tried. Techniques for estimating a metric such as the SNR are well-known and standard algorithms for this can be executed by the processor. The signals used for this preferably are known pilot signals sent by the transmitter, and the receiver knows what to expect.

In step 1440, a check is made to determine whether all candidates have been tried. If not, control returns to step 1410 to try the next candidate step. If, on the other hand, all candidate steps have been tried, control flows to step 1450. In step 1450, the candidate step/PMD compensator state corresponding to the optimized metric (e.g., highest SNR) is determined and in step 1460, the PMD compensator is adjusted to the optimized state/location on the Poincare' sphere. For this, the PMD controller commands the receiver PMD compensator 1476 through signal line 1477 to execute the optimal adjustment in 1460. Preferably, the above process is repeated until some terminal condition is met. The terminal condition can be convergence, i.e., there are no more changes in state, or upon completion of a predetermined number of dithering loops. The desirable result from this process is to restore the signal polarization components by re-aligning the RX SOPs with the TX SOPs.

While the above description calls for an exhaustive search through all possible candidate steps, it should be kept in mind that fewer than all possible steps can be tried. In a preferred embodiment, the dither adjustment is determined by a steepest gradient method. This allows one to reduce processing time (such as by choosing larger step sizes) in exchange for a slightly elevated risk that one misses the global optimum on the Poincare' sphere, when searching for an optimum metric.

After determining the optimal adjustment, The PMD controller Rx module described above with respect to FIG. 14b can find the optimum state for the receiver PMD compensator 1476 to compensate for the SOP transformation taking place in the fiber at the receiver end of the system. This will not, however, compensate for spreading of the signal caused by the frequency dependence of the transmitted signal's SOP if it does not coincide with the PSP axes of the fiber. For this, one must also compensate the transmitted signal, before it is transmitted.

Figure 14C:
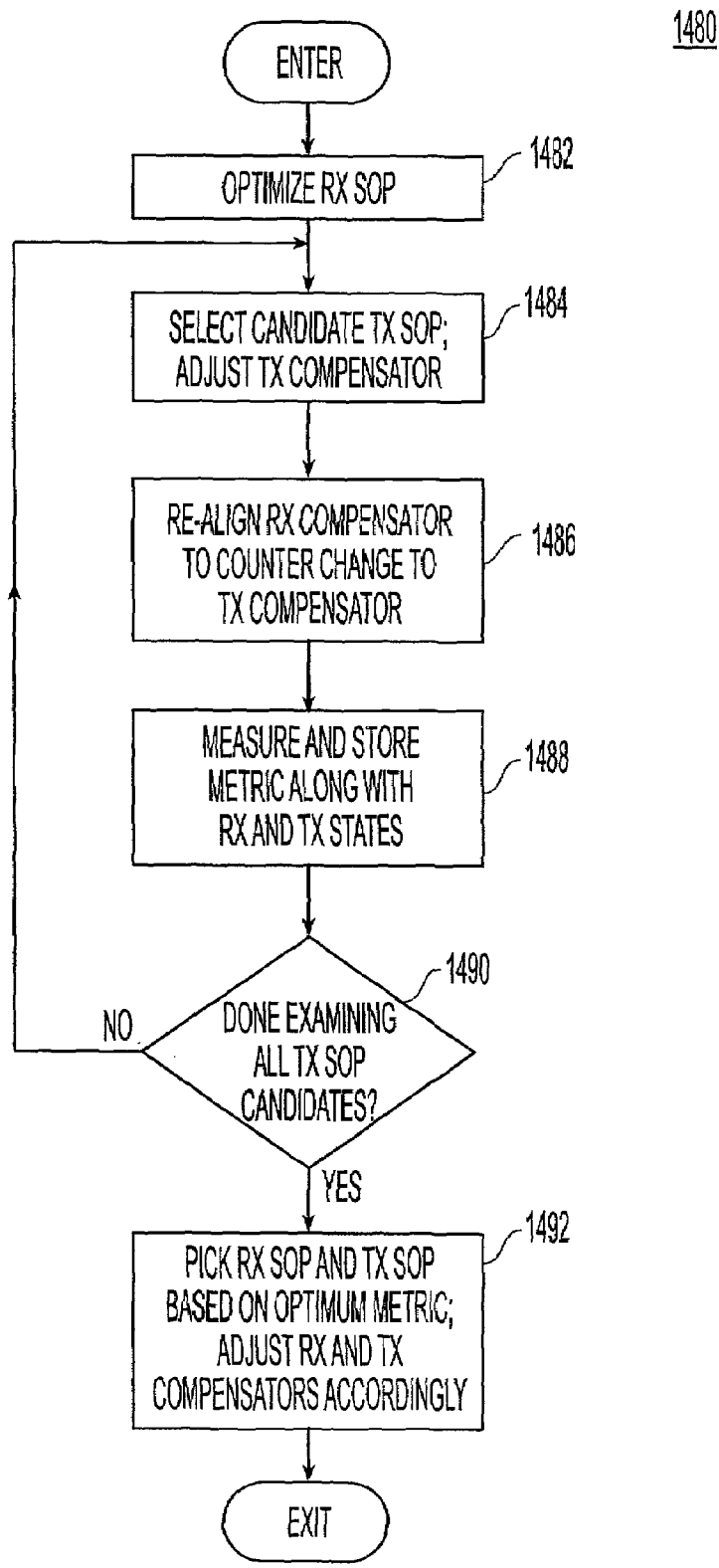

FIG. 14c presents a flow diagram 1480 describing the operation of the PMD controller Rx/Tx module to control both the receiver PMD compensator 1476 and the transmitter SOP compensator 1472, in a system such as that seen in FIG. 14a.

In step 1482, the PMD controller adjusts the Rx compensator to re-align the Rx and Tx SOPs by dithering only the receiver, as discussed above with respect to flow diagram 1405 in FIG. 14b. This means that the incoming signal is being properly compensated at the receiver.

Beginning with step 1484, the controller next searches for the PSP of the fiber by examining the ensemble of the candidate SOPs on the Poincare' sphere for the transmitter. In this regard, it is noted that the Tx SOP candidates are assumed to be uniformly distributed on the transmitter's Poincare' sphere with certain resolution—i.e., each candidate is "assigned" some portion of the sphere; the larger the number of candidates, the smaller the portion size.

Thus, in step 1484, a candidate Tx SOP is selected, and the Tx compensator is adjusted accordingly.

In step 1486, the receiver SOPs are adjusted to conform the new candidate Tx SOP so as to preserve the TX/RX SOP alignment. This is done by adjusting the receiver PMD compensator in a manner complementary to the adjustment made to the transmitter compensator. In effect then, a rotation of the Tx compensator 1472 to a new candidate SOP is followed by a "counter-rotation" of the Rx compensator 1476. To ensure synchrony between the transmitter and the receiver, the Tx SOPs preferably are adjusted on some predetermined basis that is known to the receiver so as to allow the Rx SOPs to be changed each time a new Tx candidate SOP is tried.

In step 1488, the relevant metric is calculated and stored, along with the states of the Tx SOPs and the Rx SOPs. The optimal TX SOP (i.e., the PSP) are chosen based on the same criteria as used by the RX compensator (e.g., maximum SNR).

In step 1490, a check is made to determine whether all the candidate Tx SOPs have been evaluated. If it is determined in step 1490 that additional candidate Tx SOPs remain, these are tried. If, on the other hand, it is determined in step 1490 that there are no further candidate Tx SOPs, controls flows to step 1492.

In step 1492, the transmitter and receiver compensators 1472, 1476, respectively, are adjusted based on the states corresponding to the optimum metric. Thus, the final TX/RX SOP adjustment takes place to align the TX SOP with the PSP axes.

The above-described procedure is repeated to track the polarization changes occuring in the fiber. Preferably, this is done on a continuous basis. The candidate PSP list can be limited to the subset of the original list situated around the current PSP axes during the tracking. This limitation is based on the assumption that the small variations in the fiber polarization transformation matrix will lead to small variations of the PSP orientation.

In the above-described operation of the PMD controller, the Receiver and Transmitter compensators are preferably implemented using the aforementioned Acrobat™ Polarization Control Module (PCM). It should be kept in mind, however, that other adjustable polarization control devices may be used, as well.

Transmitter Having Multiple Coding Stages

Figure 15:
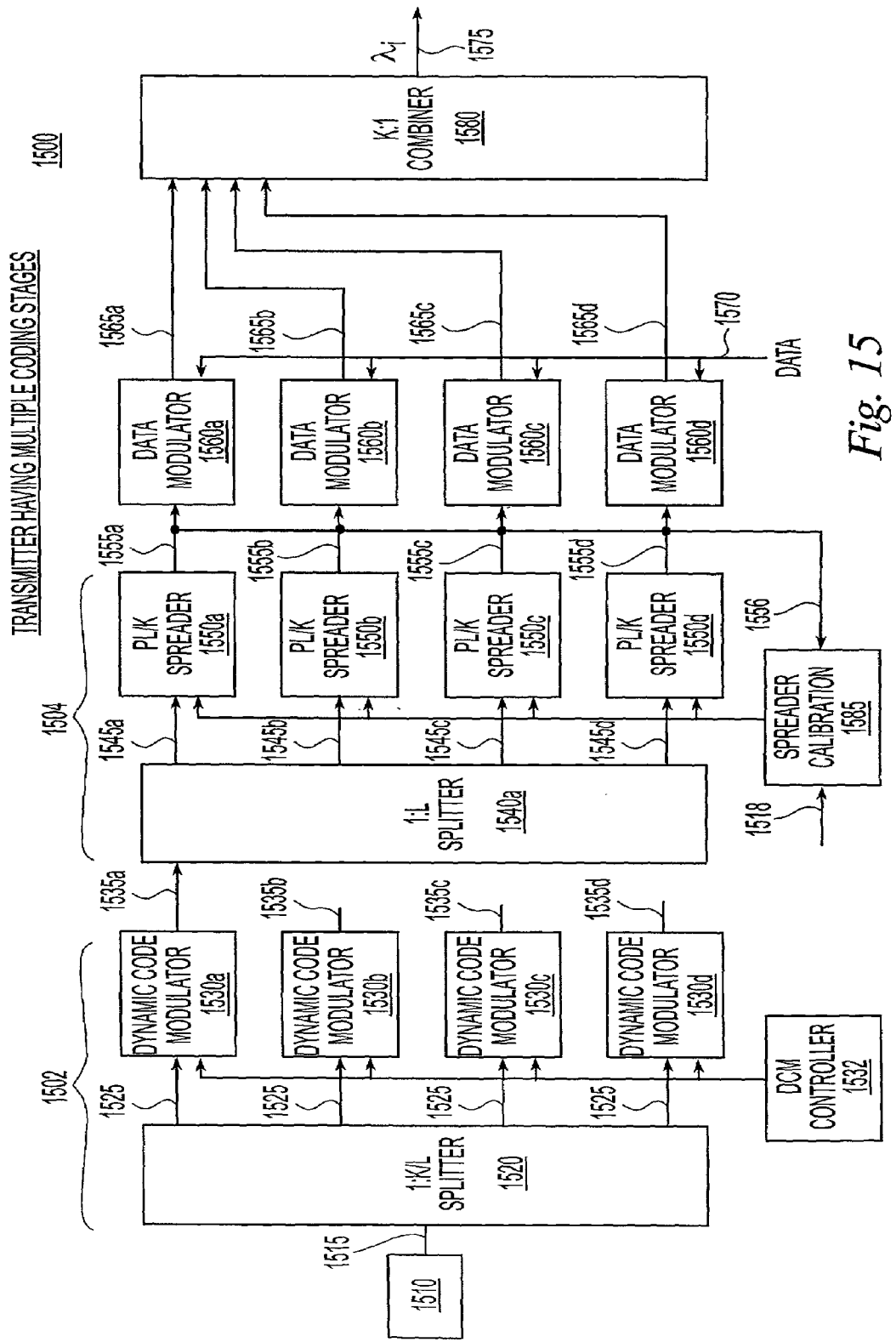
FIG. 15 is a block diagram of a transmitter having multiple coding stages.

FIG. 15 is a block diagram 1500 of an alternative channel transmitter configured to create a code division multiplexed signal in accordance with the present invention. The channel transmitter 1500 creates the code words in two stages: a pre-coding stage 1502 and a final coding stage 1504. In the following description, K represents the total number of code words that are created, P represents the number of time chips in a code, and L represents the number of code words created from each pre-coding stage. In a preferred embodiment described below, K=16, P=16 and L=4, and the symbol period T=400 ps.

The channel transmitter 1500 includes a pulsed light source 1510 which generates an optical pulse stream 1515. The optical pulse stream 1515 preferably comprises pulses separated by T*L/K=100 ps, given the preferred parameters. Thus, an optical pulse stream from source 1510 having a symbol length T=400 ps has a total of 4 pulses, each pulse being found in a single 100 ps window. This contrasts with the pulse spacing of 400 ps provided by the pulsed light source 310 in the embodiment of FIG. 3. Accordingly, the pulsed light source 1510 outputs pulse 4 times as fast as pulsed light source 310.

The optical pulse stream 1515 is directed into a 1:K/L splitter 1520 to produce K/L identical optical pulse streams 1525. Each identical optical pulse stream 1525 is then subject to a separate dynamic code modulator (DCM) 1530a, 1530b, 1530c, 1530d to create a corresponding sub-code beam 1535a, 1535b, 1535c, 1535d. Each DCM imparts a first phase shift to each of the pulses input thereto, based on pre-determined control signals from a DCM controller 1532. The resulting sub-code beams 1535a, 1535b, 1535c, 1535d preferably are orthogonal to one another. For clarity, further processing applied to only one sub-code beam 1535a is discussed, it being understood that the remaining sub-code beams 1535b, 1535c and 1535d undergo the same processing.

The sub-code beam 1535a is directed into a 1:L splitter to form four identical sub-code beams 1545a, 1545b, 1545c, 1545d having the same set of phase shifts. In general, L represents the number of code words created by a sub-code beam. Thus, each of the L=4 identical sub-code beams is then directed into a corresponding pulse spreader 1550a, 1550b, 1550c, 1550d. Pulse spreaders 1550a, 1550b, 1550c, 1550d are configured work substantially the same as pulse spreader 330 seen in FIG. 4, except that the spreader splitter performs a 1:PL/K split (PL/K being an integer) and the spreader combiner forms a PL/K:1 combination. Thus, for example, pulse spreader 1550a includes a 1 :PL/K splitter, delay circuitry for PL/K delays, chip modulation circuitry, and a PL/K:1 combiner. A spreader calibration unit 1585 controls the spreaders, in a manner analogous to spreader calibration units 335, 335a, described above. And for P=16, K=16, L=4; PL/K=4, as seen in FIG. 15.

A sub-code beam 1545a comprising a 400 ps-long symbol of four pulses spaced apart from one another by 100 ps enters the pulse spreader 1550a. Within pulse spreader 1550a, the first of the four pulses arrives in the first 100 ps window and is subject to a 1:4 split to create 4 identical copies. Delays of 0 ps, 25 ps, 50 ps and 75 ps are applied to each of the 4 split pulses, a chip modulation circuit then applies a second phase shift (or applies both a second amplitude and phase) to each of the four spilt pulses, and the code-modulated four split pulses are recombined in a 4:1 combiner. This results in four code-modulated pulses within the first 100 ps window, each pulse having been modulated twice: once by the dynamic code modulator 1530a in the first stage 1502, and a second time by a chip modulating circuit associated with the pulse spreader 1550a in the second stage 1504. The second, third and fourth pulses belonging to sub-code beam 1545a arrive in the second, third and fourth 100 ps windows of the symbol, respectively. They are similarly split, delayed, subject to a second phase shift by the same pulse spreader 1550a, and then recombined.

Thus, the output of the pulse spreader 1550a is thus a single code word 1555a having a total of P=16 pulses. Similarly, the output of the other pulse spreaders 1550b, 1550c, 1550d are different code words 1555b, 1555c, 1555d, respectively, each of the four code words originating from the sub-code word 1535a being orthogonal to the other three, and also to the other 12 code words originating from the other three sub-code words 1535b, 15335c, 1535d.

The ensemble of code words next enters a data modulation stage comprising data modulators 1560a, 1560b, 1560c, 1560d. Code word 1555a enters the data modulator 1560a where the data from a data stream 1570 under the control of a data controller (not shown) is imprinted thereon to thereby form a data-modulated code word 1565a. This process is repeated for code words 1555b, 1555c, 1555d with data modulators 1560b, 1560c, 1560d, respectively, to form data-modulated code words 1565b, 1565c, 1565d, respectively. These four data-modulated code words, along with the other 12 code words originating from the other three sub-code words 1535b, 15335c, 1535d (for a total of K=16 code words), are then input to a 1:K combiner 1580 to create the data beam 1575 which is directed into a DWDM multiplexer (not shown). The data beam is thus a division multiplexed optical signal comprising orthogonal code words that have been data-modulated, the code words preferably having H and V polarizations due to a polarization beam combiner within the data modulators.

The transmitter 1500 is provided with one or more spreader calibration units 1585, which behave in a manner similar to those discussed above. Thus, the spreader calibration units 1585 receive inputs from a reference light source 1518 and also from the outputs of the pulse spreaders 1555a, 1555b, 1555c, 1555d on lines 1556. The spreader calibration units 1585 also output signals to these pulse spreaders, to ensure that each of the pulse spreaders has proper modulation.

The invention described and claimed herein is not to be limited in scope by the preferred embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A code division multiplexed optical communication system comprising:
at least one transmitter configured to receive a first data stream and transmit a code division multiplexed optical signal comprising a number K code words modulated with first data from said first data stream(where K is an integer greater than 1);
wherein the transmitter comprises:
a pulsed light source:
a transmitter splitter having a splitter input and a plurality of splitter outputs, the transmitter splitter having the pulsed light source input thereto and outputting at least a number K identical code beams;
K code modulators, each code modulator configured to receive one of the at least K identical code beams and output a corresponding data-modulated code word; wherein each of the code modulators comprises: a pulse spreader configured to receive one of the K identical code beams, said one of the K identical code beams comprising a single pulse within a predetermined time window, the pulse spreader being further configured to output an imprinted code beam having a number P modulated pulses within that time window; and a data modulator configured to receive said imprinted code beam from the pulse spreader and modulate said imprinted code beam with data from said first data stream to thereby form a data-modulated code word; wherein the pulse spreader comprises:
a 1:P splitter configured to split one of said K code beams input thereto into P identical code beams (where P is an integer greater than 1), each code beam having a single pulse; P chip modulators, each chip modulator configured to receive a single pulse and output a delayed modulated pulse, the p-th chip modulator comprising: a delay circuit configured to delay said single pulse by $(p-1)*C$, where $C=T/P$ is a chip period, T being a symbol period (T is an integer greater than 1) and p representing an index; and a chip modulation circuit configured to code-modulate the delayed single pulse by a p-th code value belonging to an orthogonal code of length P; and a P:1 combiner configured to combine code-modulated outputs from the P chip modulation circuits into the imprinted code beam which comprises P pulses within said symbol period T; and
a transmitter combiner configured to combine the K data-modulated code words into a code division multiplexed optical signal; wherein the K data-modulated code words are orthogonal to one another; and
at least one receiver optically connected to the first transmitter and configured to receive said code division multiplexed optical signal, detect and demodulate said K code words within the code division multiplexed optical signal, and output said first data, wherein the K code words are orthogonal to one another.

2. The optical communication system of claim 1, wherein the transmitter further comprises a spreader calibration unit which receives the imprinted code beam from the pulse spreader and a reference light source as inputs, and outputs a spreader control signal which is sent to the pulse spreader.

3. The optical communication system of claim 1 wherein the data modulator comprises: splitter circuitry configured to split the imprinted mode beam into identical first (H1), second (H2), third (V1) and fourth (V2) component beams; a first phase shifter configured to impart a 90.degree. phase shift the second component beam (H2); a second phase shifter configured to impart a 90.degree. phase shift to the fourth component beam (H4); a first modulator configured to modulate the first component beam (H1) with first data; a second modulator configured to modulate the phase-shifted second component beam (H2) with second data; a third modulator configured to modulate the third component beam (V1) with third data; a fourth modulator configured to modulate the phase-shifted fourth component beam (V2) with fourth data; a first combiner (840a) configured to combine the data-modulated first component beam (H1) with the data-modulated and phase-shifted second component beam (H2), and output a first data-modulated beam (H'); a second combiner (840b) configured to combine the data-modulated third component beam (V1) with the data-modulated and phase-shifted fourth component beam (V2), and output a second data-modulated beam (V'); and a polarization beam combiner (850) configured to combine the first and second data-modulated beams and output a data beam (342) having two orthogonal polarizations.

4. The optical communication system of claim 1 wherein the receiver comprises:
  a receiver splitter having a splitter input and a plurality of splitter outputs, the splitter input receiving the code division multiplexed optical signal comprising K data-modulated code words, and outputting at least K identical received code division multiplexed optical signals each comprising K data-modulated code words; and at least K code receivers, each code receiver having one of said identical received code division multiplexed optical signals input thereto, each code receiver having associated therewith: a receiver pulse spreader configured to create a reference imprinted code beam corresponding to one of the K code words in said received code division multiplexed optical signal; and a receiver unit having an information signal and a reference signal input thereto, wherein the information signal is said one of said identical received code division multiplexed optical signals and the reference signal is the imprinted reference code beam, the receiver unit configured to detect and demodulate said one of the K data-modulated code words to which the reference imprinted code beam corresponds.

5. The optical communication system of claim 4, wherein: the receiver unit comprises an optical detection circuit that receives the information signal and the reference signal, the optical detection circuit configured to output in-phase and quadrature components of a first and a second orthogonal polarization component of the information signal.

6. The optical communication system of claim 5, wherein the receiver unit further comprises a polarization mode dispersion controller configured to: receive digitized in-phase and quadrature components of the first and second orthogonal polarization components of the information signal, and output at least one polarization control signal in response thereto.

7. The optical communication system of claim 6, wherein the at least one polarization control signal is input to a polarization compensator associated with the receiver.

8. The optical communication system of claim 5, wherein the optical detection circuit comprises: a polarization beam splitter configured to receive and split the information signal into first and second orthogonal polarization components; a first optical phase detector configured to receive the first orthogonal polarization component and the reference signal as inputs, and output in-phase and quadrature components of the first orthogonal polarization component; a second optical phase detector configured to receive the second orthogonal polarization component and the reference signal as inputs, and output in-phase and quadrature components of the second orthogonal polarization component.

9. The optical communication system of claim 8, wherein the optical detection circuit further comprises: a symbol synchronizer circuit receiving said in-phase and quadrature components of the first and second orthogonal polarization components of the information signal, and outputting at least one timing signal to synchronize symbol boundaries of said data-modulated codewords in said optical phase detectors. a variable delay configured to synchronize the first and second orthogonal polarization components, the variable delay receiving a delay signal from the symbol synchronizer circuit.

10. The optical communication system of claim 8, wherein the first and second optical phase detectors each comprise: an optical hybrid detector having first and second signal inputs and first and second signal outputs, the first signal output being proportional an in-phase difference between the first and second signal inputs, and the second signal output being proportional to a quadrature difference between the first and second signal inputs; and a first signal conditioning cascade circuit comprising a first amplifier, a first low pass filter, a first DC bias remover, a first sample and hold, and a first analog-to-digital converter, all arranged to process the first signal output from the optical hybrid detector to thereby form a digitized in-phase component signal; and a second signal conditioning cascade circuit comprising a second amplifier, a second low pass filter, a second DC bias remover, a second sample and hold, and a second analog-to-digital converter, all arranged to process the second signal output from the optical hybrid detector to thereby form a digitized quadrature component signal.

11. The optical communication system of claim 10, wherein the optical hybrid detector having first and second signal inputs comprises: optical circuitry configured to split and phase shift the second signal input to form a first signal (R3) having 0.degree. phase shift, a second signal (R4) having a 90.degree. phase shift, a third signal (R5) having a 180.degree. phase shift and a fourth signal (R6) having a 270.degree. phase shift; first, second, third and fourth combiners, configured to combine a copy of the first signal input with a copy of the second signal input shifted by 0.degree., 90.degree., 180.degree. and 270.degree., respectively, to output first second, third and fourth combined beams, respectively; a first matched detector configured to receive said first and third combined beams and output a first output signal that is proportional to an in-phase difference between the first and second signal inputs; and a second matched detector configured to receive said second and fourth combined beams and output a second output signal that is proportional to quadrature difference between the first and second signal inputs.

12. A pulse spreader configured to accept a code beam comprising a single pulse within a symbol period of length T, and output an imprinted code beam comprising a number P modulated pulses having a length C=T/P chip periods, the pulse spreader comprising: a 1:P splitter configured to split the code beam input thereto into P identical code beams, each code beam having a single pulse; P chip modulators, each chip modulator configured to receive a single pulse and output a delayed modulated pulse, the p-th chip modulator comprising: a delay circuit configured to delay said single pulse by (p−1)*C, where C=T/P is a chip period, p representing an index; and a chip modulation circuit configured to code-modulate the delayed single pulse by a p-th code value belonging to an orthogonal code of length P; and a P:1 combiner configured to combine code-modulated outputs from the P chip modulation circuits into the imprinted code word comprising P pulses within said symbol period T.

13. An optical signal data modulator for modulating an input signal, the optical signal data modulator comprising: optical splitter circuitry configured to split the input signal into identical first (H1), second (H2), third (V1) and fourth (V2) component beams; a first phase shifter configured to impart a 90.degree. phase shift to the second component beam (H2); a second phase shifter configured to impart a 90.degree. phase shift to the fourth component beam (H4); a first modulator configured to modulate the first component beam (H1) with first data; a second modulator configured to modulate the phase-shifted second component beam (H2) with second data; a third modulator configured to modulate the third component beam (V1) with third data; a fourth modulator configured to modulate the phase-shifted fourth component beam (V2) with fourth data; a first combiner (840a) configured to combine the data-modulated first component beam (H1) with the data-modulated and phase-shifted second component beam (H2), and output a first data-modulated beam (H'): a second combiner (840b) configured to combine the data-modulated third component beam (V1) with the data-modulated and phase-shifted fourth component beam (V2), and output a second data-modulated beam (V'); and a polarization beam combiner (850) configured to combine the first and second data-modulated beams and output a data beam (342) having two orthogonal polarizations.

14. The optical signal data modulator of claim 13, wherein the first and second phase shifters and the first, second, third and fourth modulators receive control signals from a power balancer.

15. A code division multiplexed optical signal receiver comprising: a receiver splitter having a splitter input and a plurality of splitter outputs, the splitter input receiving the code division multiplexed optical signal comprising K code words modulated with data, and outputting at least K identical received code division multiplexed optical signals each comprising K data-modulated code words; and at least K code receivers, each code receiver having one of said identical received code division multiplexed optical signals input thereto, each code receiver having associated therewith: a receiver pulse spreader configured to create a reference imprinted code beam corresponding to one of the K code words in said received code division multiplexed optical signal; and a receiver unit having an information signal and a reference signal input thereto, wherein the information signal is said one of said identical received code division multiplexed optical signals and the reference signal is the imprinted reference code beam, the receiver unit configured to detect and demodulate said one of the K data-modulated code words to which the reference imprinted code beam corresponds.

16. An optical phase detector in optical communications system comprising: an optical hybrid detector having first and second signal inputs and first and second signal outputs, the first signal output being proportional an in-phase difference between the first and second signal inputs, and the second signal output being proportional to a quadrature difference between the first and second signal inputs; and a first signal conditioning cascade circuit comprising a first amplifier, a first low pass filter, a first DC bias remover, a first sample and hold, and a first analog-to-digital converter, all arranged to process the first signal output from the optical hybrid detector to thereby form a digitized in-phase component signal; and a second signal conditioning cascade circuit comprising a second amplifier, a second low pass filter, a second DC bias remover, a second sample and hold, and a second analog-to-digital converter, all arranged to process the second signal output from the optical hybrid detector to thereby form a digitized quadrature component signal.

17. The optical phase detector of claim 16, wherein the optical hybrid detector having first and second signal inputs comprises: optical circuitry configured to split and phase shift the second signal input to form a first signal (R3) having 0.degree. phase shift, a second signal (R4) having a 90.degree. phase shift, a third signal (R5) having a 180.degree. phase shift and a fourth signal (R6) having a 270.degree. phase shift first, second, third and fourth combiners, configured to combine a copy of the first signal input with a copy of me second signal input shifted by 0.degree., 90.degree, 180.degree and 270.degree, respectively, to output first, second, third and fourth combined beams, respectively; a first matched detector configured to receive said first and third combined beams and output a first output signal that is proportional to an in-phase difference between the first and second signal inputs; and a second matched detector configured to receive said second and fourth combined beams and output a second output signal that is proportional to quadrature difference between the first and second signal inputs.

18. An optical hybrid detector of claim 16 having first and second signal inputs and comprising: optical circuitry configured to split and phase shift the second signal input to form a first signal (R3) having 0.degree. phase shift, a second signal (R4) having a 90.degree. phase shift, a third signal (R5) having a 180.degree. phase shift and a fourth signal (R6) having a 270.degree. phase shift; first, second, third and fourth combiners, configured to combine a copy of the first signal input with a copy of the second signal input shifted by 0.degree., 90.degree., 180.degree. and 270.degree., respectively, to output first, second, third and fourth combined beams, respectively; a first matched detector configured to receive said first and third combined beams and output a first output signal that is proportional to an in-phase difference between the first and second signal inputs; and a second matched detector configured to receive said second and fourth combined beams and output a second output signal that is proportional to quadrature difference between the first and second signal inputs.

* * * * *